United States Patent
Shin et al.

(10) Patent No.: US 12,525,269 B2
(45) Date of Patent: Jan. 13, 2026

(54) METHOD OF CALIBRATING IMPEDANCE OF MEMORY DEVICE AND IMPEDANCE CALIBRATION CIRCUIT PERFORMING THE SAME

(71) Applicant: SAMSUNG ELECTRONICS CO., LTD., Suwon-si (KR)

(72) Inventors: Dongho Shin, Suwon-si (KR); Kangyoon Lee, Seoul (KR); Seonkyoo Lee, Suwon-si (KR); Junha Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 23 days.

(21) Appl. No.: 18/604,593

(22) Filed: Mar. 14, 2024

(65) Prior Publication Data
US 2025/0104749 A1    Mar. 27, 2025

(30) Foreign Application Priority Data
Sep. 22, 2023  (KR) .................. 10-2023-0127171

(51) Int. Cl.
*G11C 7/10*  (2006.01)
*G11C 7/22*  (2006.01)

(52) U.S. Cl.
CPC ........ *G11C 7/22* (2013.01); *G11C 2207/2254* (2013.01)

(58) Field of Classification Search
CPC ......... G11C 7/22; G11C 7/1051; G11C 5/147; G11C 2207/2254
See application file for complete search history.

(56) References Cited

U.S. PATENT DOCUMENTS

| | | |
|---|---|---|
| 7,528,626 B2 | 5/2009 | Kim |
| 8,947,119 B2 | 2/2015 | Jang |
| 9,531,382 B1 | 12/2016 | Miwa et al. |
| 9,563,213 B2 | 2/2017 | Addepalli et al. |
| 9,899,922 B1 | 2/2018 | Remple et al. |

(Continued)

FOREIGN PATENT DOCUMENTS

| | | | | |
|---|---|---|---|---|
| CN | 115458000 A | * | 12/2022 | ......... G11C 11/4096 |
| JP | 2004032721 A | * | 1/2004 | |

(Continued)

*Primary Examiner* — Seokjin Kim
(74) *Attorney, Agent, or Firm* — Wolf, Greenfield & Sacks, P.C.

(57) ABSTRACT

A method of calibrating impedance of a memory device including a data transmitter includes: outputting a comparison signal by comparing a power supply voltage and a reference voltage, the power supply voltage being supplied to the data transmitter when the data transmitter is driven; storing a voltage level of the reference voltage when the comparison signal changes logical state; adjusting the reference voltage based on the comparison signal such that the voltage level of the reference voltage increases or decreases; and calibrating an output impedance of the memory device based on a digital code corresponding to an average reference voltage level, the average reference voltage level being obtained by averaging a prescribed number of voltage levels of the reference voltage stored as a result of repeatedly outputting the comparison signal, storing the voltage level of the reference voltage, and adjusting the reference voltage.

20 Claims, 20 Drawing Sheets

(56) References Cited

U.S. PATENT DOCUMENTS

| | | | |
|---|---|---|---|
| 10,347,358 B2* | 7/2019 | Kim | G11C 29/022 |
| 11,237,579 B2* | 2/2022 | He | G11C 11/4093 |
| 11,296,698 B2 | 4/2022 | Michioka | |
| 11,830,541 B2 | 11/2023 | Kim et al. | |
| 2018/0053539 A1* | 2/2018 | Shin | G11C 29/025 |

FOREIGN PATENT DOCUMENTS

| | | | | |
|---|---|---|---|---|
| KR | 20080002692 A | | 1/2008 | |
| KR | 20100065761 A | | 6/2010 | |
| KR | 20140003077 A | | 1/2014 | |
| KR | 20190029014 A | | 3/2019 | |
| KR | 20220063581 A | * | 5/2022 | G11C 5/147 |
| KR | 20220165535 A | | 12/2022 | |

\* cited by examiner

| t | t1 | t2 | t3 | t4 | t5 | t6 |
|---|---|---|---|---|---|---|
| C_Result | 0 | 0 | 0 | 0 | 1 | 0 |

| t | t1 | t2 | t3 | t4 | t5 | t6 |
|---|----|----|----|----|----|----|
| V_ref | 2V | 1.8V | 1.6V | 1.4V | 1.2V | 1.4V |
| C_Result | 0 | 0 | 0 | 0 | 1 | 0 |

| t | t1 | t2 | t3 | t4 | t5 | t6 | t7 | t8 | t9 | t10 | t11 | t12 |
|---|---|---|---|---|---|---|---|---|---|---|---|---|
| V_ref | 2 | 1.8 | 1.6 | 1.4 | 1.2 | 1.4 | 1.2 | 1.0 | 1.2 | 1.4 | 1.6 | 1.8 |
| C_Result | 0 | 0 | 0 | 0 | 1 | 0 | 0 | 1 | 1 | 1 | 1 | 0 |
| Saved_V_ref | | | | | 1.4V | 1.2V | | 1.2V | | | | 1.6V |
| Tog_CNT | | | | | 1 | 2 | | 3 | | | | 4 |

| V_in | ZQ code |
|---|---|
| V_in0 | code 1 |
| V_in0−ΔV | code 2 |
| ⋮ | ⋮ |
| V_in0−(m−1)ΔV | code m |

METHOD OF CALIBRATING IMPEDANCE OF MEMORY DEVICE AND IMPEDANCE CALIBRATION CIRCUIT PERFORMING THE SAME

CROSS-REFERENCE TO RELATED APPLICATION(S)

This application claims priority under 35 U.S.C. § 119 to Korean Patent Application No. 10-2023-0127171, filed Sep. 22, 2023, the contents of which is hereby incorporated herein by reference in its entirety.

BACKGROUND

The present inventive concept relates generally to memory devices, and more particularly, to methods of calibrating impedance of memory devices and impedance calibration circuits performing the methods.

As the operating speed of memory devices increases, the swing width of signals transmitted and received between the memory devices and the memory controllers decreases, and signal distortion due to impedance mismatch becomes more of a problem. To solve this signal distortion problem, an impedance calibration operation (i.e., an impedance adjustment operation) that constantly adjusts the output and/or termination impedance of the memory device to be independent of changes in process, voltage and temperature (PVT) by using external resistors is being studied. The impedance calibration operation as described above may be called an input/output offset removal operation or a ZQ calibration operation.

SUMMARY

At least one example embodiment of the present disclosure provides a method of operating a memory device that may ensure operational stability.

At least one example embodiment of the present disclosure provides a memory device performing the method.

According to example embodiments, a method of calibrating impedance of a memory device including a data transmitter includes outputting a comparison signal by comparing a power supply voltage and a reference voltage, the power supply voltage being supplied to the data transmitter when the data transmitter is driven, storing a voltage level of the reference voltage when the comparison signal is toggled, adjusting the reference voltage based on the comparison signal such that the voltage level of the reference voltage increases or decreases, and calibrating an output impedance of the memory device based on an average ZQ code corresponding to an average reference voltage level, the average reference voltage level being obtained by averaging N (where N is a positive integer) voltage levels of the reference voltage stored as a result of repeatedly outputting the comparison signal, storing the voltage level of the reference voltage, and adjusting the reference voltage.

According to example embodiments, an impedance calibration circuit included in a memory device including a data transmitter includes a ZQ calibration module configured to calibrate an output impedance of the memory device based on an average ZQ code, and an IR (voltage) drop sensing module configured to obtain the average ZQ code, wherein the IR drop sensing module includes a comparator configured to output a comparison signal by comparing a power supply voltage and a reference voltage, the power supply voltage being supplied to the data transmitter when the data transmitter is driven, a reference voltage generator configured to generate the reference voltage, and configured to adjust the reference voltage based on the comparison signal such that a voltage level of the reference voltage increases or decreases, and a first module configured to store N voltage levels of the reference voltage when the comparison signal is toggled, configured to obtain an average reference voltage level by averaging the N voltage levels of the reference voltage, and configured to calculate an average ZQ code corresponding to the average reference voltage level.

According to example embodiments, a method of calibrating impedance of a memory device including a data transmitter includes: operation S1—when a voltage level of a power supply voltage is less than or equal to a voltage level of a reference voltage, generating a comparison signal having a first logic level; operation S2—when the voltage level of the power supply voltage is greater than the voltage level of the reference voltage, generating the comparison signal having a second logic level different from the first logic level; operation S3—determining whether the comparison signal has toggled from one of the first and second logic levels to the other logic level; operation S4—outputting an enable signal that is activated when the comparison signal is toggled; operation S5—storing the voltage level of the reference voltage based on activation of the enable signal; operation S6—when the voltage level of the power supply voltage is less than or equal to the voltage level of the reference voltage, reducing the voltage level of the reference voltage by a first voltage level; operation S7—when the voltage level of the power supply voltage is greater than the voltage level of the reference voltage, increasing the voltage level of the reference voltage by the first voltage level; and operation S8—calibrating an output impedance of the memory device based on an average ZQ code corresponding to an average reference voltage level, the average reference voltage level being obtained by averaging N (N is a positive integer) voltage levels of the reference voltage stored as a result of repeatedly performing the operations S1 to S7.

In the method of calibrating impedance of a memory device and the impedance calibration circuit according to example embodiments, when various voltage drops occur in the data transmitter depending on the operation of the memory device, the output impedance of the memory device may be adjusted to correspond to the average voltage drop level. Thus, the deterioration of driver strength characteristics due to the voltage drop of the data transmitter may be improved, and the operational stability of the memory device may be improved.

BRIEF DESCRIPTION OF THE DRAWINGS

Illustrative, non-limiting example embodiments will be more clearly understood from the following detailed description taken in conjunction with the accompanying drawings, wherein like reference numerals (when used) indicate corresponding elements throughout the several views, and in which.

DETAILED DESCRIPTION

Figure 1:
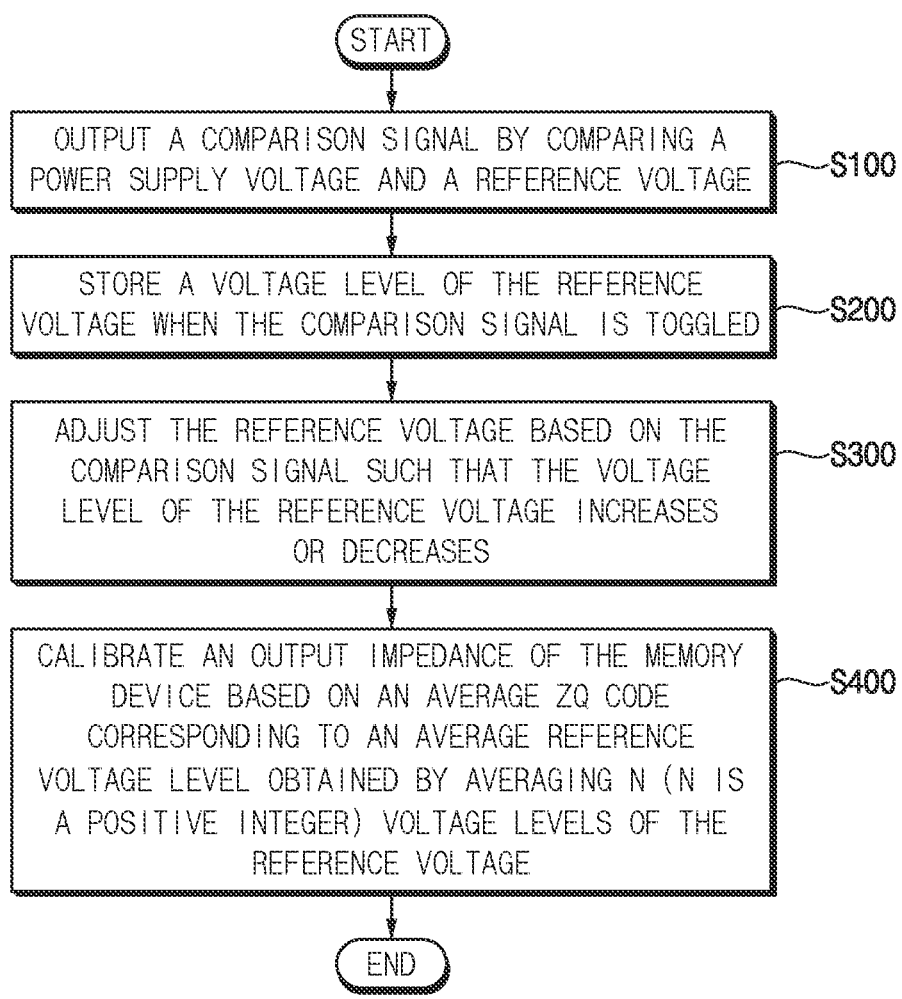
FIG. 1 is a flowchart illustrating a method of calibrating impedance of a memory device according to example embodiments.

Various example embodiments of the present inventive concept will be described more fully with reference to the accompanying drawings, in which illustrative embodiments are shown. The present disclosure may, however, be embodied in many different forms and should not be construed as limited to the embodiments set forth herein. Like reference numerals refer to like elements throughout this application.

FIG. 1 is a flowchart illustrating a method of calibrating impedance of a memory device according to example embodiments.

Referring to FIG. 1, a method of calibrating impedance of a memory device according to example embodiments may be performed to calibrate the output impedance of the memory device. The memory device may include a data transmitter for data output, and an impedance calibration circuit connected to the data transmitter for performing the method of calibrating impedance.

A comparison signal is output by comparing a power supply voltage and a reference voltage, and the power supply voltage is supplied to the data transmitter when the data transmitter is driven (i.e., activated) (operation S100). For example, the data transmitter may be connected to a data input/output (I/O) pad of the memory device (e.g., DQ pad). The power supply voltage supplied to the data transmitter may represent a voltage used to drive a pre-driver circuit or module included in the data transmitter. The reference voltage may be a voltage for measuring the degree of voltage drop of the power supply voltage during the driving of the memory device. For example, a circuit generating the reference voltage may be configured the same as a circuit supplying the power supply voltage to the data transmitter. For example, as will be described with reference to FIGS. 19 and 20, the reference voltage may be generated by a replica circuit of the circuit supplying the power supply voltage to the data transmitter. For example, the operation of comparing the reference voltage and the reference voltage may be performed periodically (e.g., at prescribed time intervals, upon the occurrence of a prescribed event, etc.). The operation of comparing the power supply voltage and the reference voltage will be described in detail with reference to FIGS. 3 and 4.

A voltage level of the reference voltage is stored when the comparison signal is toggled (operation S200). The toggle of the comparison signal may indicate an operation where a logic level of the comparison signal changes from one logic level or state (e.g., a logic high level) to another logic level or state (e.g., a logic low level). Thus, the term "toggle" (or "toggled," "toggling," or like terms) as may be used herein may refer broadly to a change in logical state (e.g., voltage level, logic level, etc.) of a signal; that is, from a first state to a second state that is different from the first state. For example, the reference voltage may be generated based on a code. In this case, an operation that stores the voltage level of the reference voltage may indicate an operation of storing the code that generates the reference voltage. In some embodiments, for example, an analog-to-digital converter (ADC) may be used to convert the analog voltage level of the reference voltage to a digital representation of the analog voltage level. For example, the operation that stores the voltage level of the reference voltage may be performed a plurality of times according to the toggles of the comparison signal. The operation of storing the voltage level of the reference voltage will be described in detail with reference to FIGS. 5 and 6.

The reference voltage may be adjusted based on the comparison signal, such that the voltage level of the reference voltage increases or decreases (operation S300). For example, the voltage level of the reference voltage may be adjusted periodically. The operation of adjusting the reference voltage will be described in detail with reference to FIGS. 8 and 9.

An output impedance of the memory device is calibrated based on an average ZQ code (i.e., digital code) corresponding to an average reference voltage level, and the average reference voltage level is obtained by averaging a prescribed number (e.g., N, where N is a positive integer) of voltage levels of the reference voltage stored as a result of repeatedly outputting the comparison signal, storing the voltage level of the reference voltage, and adjusting the reference voltage (operation S400). ZQ calibration is an on-die termination (ODT) facilitation technique to calibrate termination impedance in a device and thereby limit the compromising of signal integrity over variations in process, voltage and temperature (PVT). A preset ZQ code may represent a code that determines a strength of a driver of a memory device by controlling an on-off operation of a plurality of transistors. In one or more embodiments, the ZQ code may be a digital representation of a certain voltage level. An average ZQ code may be a digital representation of the average reference voltage level. Operations S100, S200, and S300 may be performed repeatedly and periodically based on clock signals. For example, operations S100, S200, and S300 may be performed based on the clock signals provided to the memory device. The number N may be set by the user arbitrarily. The operation of obtaining the average ZQ code will be described in detail with reference to FIG. 10.

In the method of calibrating impedance of a memory device and the impedance calibration circuit according to example embodiments, when various voltage drops occur in the data transmitter depending on the operation of the memory device, the output impedance of the memory device may be adjusted to correspond to the average voltage drop level. Thus, the deterioration of driver strength characteristics due to the voltage drop of the data transmitter may be prevented, and the operational stability of the memory device may be improved.

Figure 2:
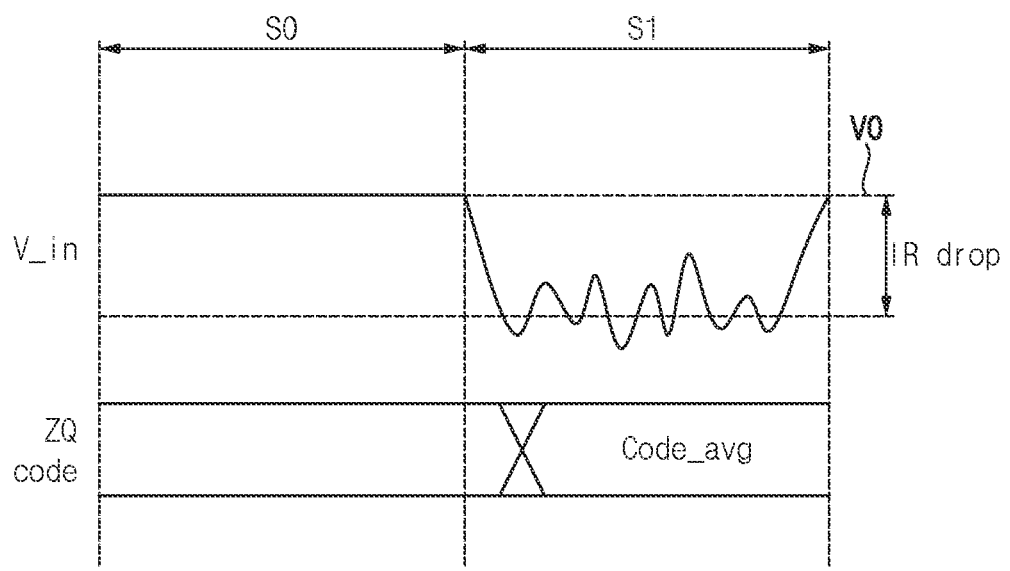
FIG. 2 is a diagram for describing non-limiting applications where a method of calibrating impedance of a memory device according to example embodiments may be applied.

FIG. 2 is a diagram for describing non-limiting cases where a method of calibrating impedance of a memory device according to example embodiments may be applied.

Referring to FIG. 2, a method of calibrating impedance of a memory device according to example embodiments may be performed when a voltage drop (e.g., current·resistance (IR) drop) occurs in a driving state S1 of the data transmitter.

In a non-driving state S0 of the data transmitter, a power supply voltage V_in may have an initial voltage level V0. In the driving state S1 of the data transmitter, the power supply voltage V_in may exhibit a drop in voltage, and may therefore have a voltage level lower than the initial voltage level V0. For example, the power supply voltage V_in, during the driving state S1, may have a voltage level that oscillates (i.e., fluctuates) in response to the voltage drop during operations of the memory device. For example, in this specification, the voltage drop (IR) may be indicative of a voltage drop due to an electrical current (I) flowing through wires (or other resistive elements (R)) between the data transmitter of the memory device and a data receiver of the memory device. An average ZQ code Code_avg may be obtained by adjusting the voltage level of the reference voltage to match the voltage level of the power supply voltage V_in in the driving state S1 of the data transmitter. Based on the average ZQ code Code_avg, the output impedance of the memory device may be adjusted.

Figure 3:
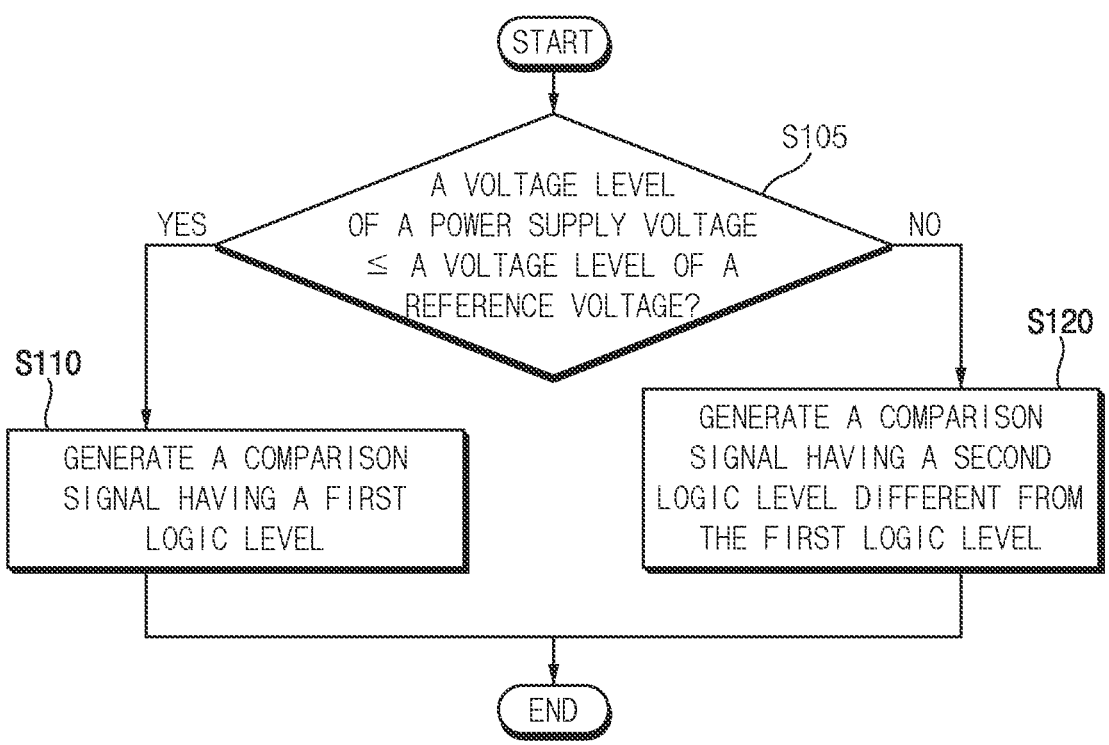
FIG. 3 is a flowchart illustrating a non-limiting example of outputting a comparison signal in a method of calibrating impedance of a memory device according to example embodiments.

FIG. 3 is a flowchart illustrating an example of outputting a comparison signal in a method of calibrating impedance of a memory device according to example embodiments.

Referring to FIG. 3, operations S105, S110 and S120 may be an example implementation of operation S100 in FIG. 1, although embodiments are not limited thereto.

When the voltage level of the power supply voltage is determined to be less than or equal to the voltage level of the reference voltage (operation S105: Yes), the comparison signal having a first logic level may be generated (operation S110), and when the voltage level of the power supply voltage is greater than the voltage level of the reference voltage (operation S105: No), the comparison signal having a second logic level different from the first logic level may be generated (operation S120). For example, in one or more embodiments, an operation of comparing the voltage level of the power supply voltage and the voltage level of the reference voltage may be performed by a comparator. In this case, the first logic level may represent one of a logic low level or a logic high level, and the second logic level may represent one of the logic high level or the logic low level.

Figure 4:
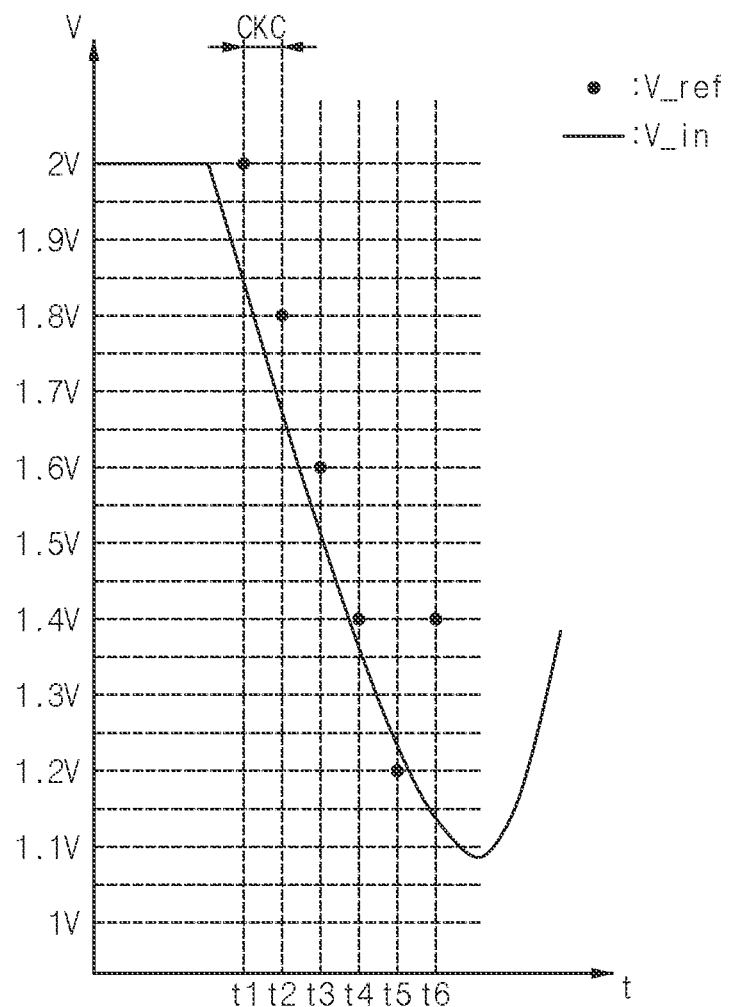
FIG. 4 is a diagram for describing outputting a comparison signal in a method of calibrating impedance of a memory device according to example embodiments.

FIG. 4 is a diagram for describing outputting a comparison signal in a method of calibrating impedance of a memory device according to example embodiments. Descriptions repeated with those of FIG. 3 will be omitted.

Referring to FIG. 4, comparing a voltage level of a power supply voltage V_in and a voltage level of a reference voltage V_ref may be illustrated. At a first time point t1, since the voltage level of the reference voltage V_ref is about 2V and the voltage level of the power supply voltage V_in is about 1.85V, a comparison signal C_Result may have a first logic level "O". Similarly, at time points t2, t3, t4, and t6, since the voltage level of the reference voltage V_ref is higher than the voltage level of the power supply voltage V_in, the comparison signal C_Result may have a first logic level "0". However, at the time point t5, since the voltage level of the reference voltage V_ref is about 1.2V and the voltage level of the power supply voltage V_in is about 1.25V, the comparison signal C_Result may have a second logic level "1" that is different from the first logic level "0". In addition, an operation of comparing the voltage level of the power supply voltage V_in and the voltage level of the reference voltage V_ref may be performed every clock cycle CKC.

Figure 5:
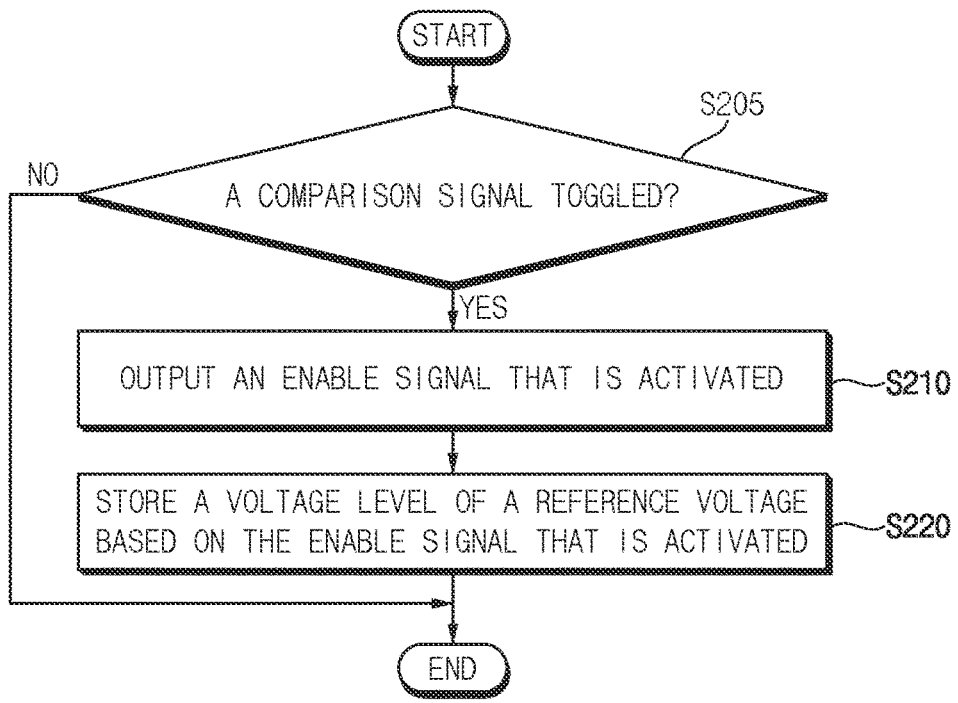
FIGS. 5 and 6 are flowcharts illustrating non-limiting examples of storing a voltage level of a reference voltage in a method of calibrating impedance of a memory device according to example embodiments.
Figure 6:
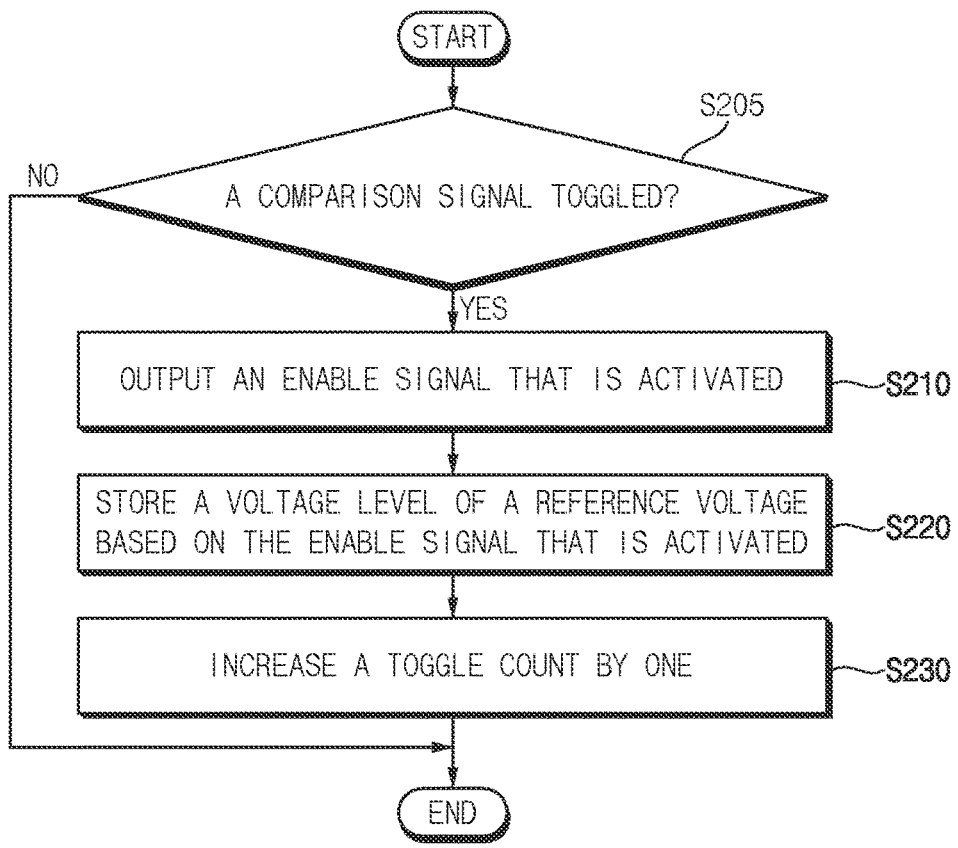

FIGS. 5 and 6 are flowcharts illustrating examples of storing a voltage level of a reference voltage in a method of calibrating impedance of a memory device according to example embodiments.

Referring to FIG. 5, operations S205, S210 and S220 may be an example implementation of operation S200 in FIG. 1.

Whether a comparison signal has toggled from one of a first and second logic levels to another one of the first and second logic levels may be determined (operation S205). For example, if operation S100 in FIG. 1 is performed again after adjusting the reference voltage level in operation S300 in FIG. 1, toggling of the comparison signal may occur. Whether the comparison signal is toggled may be determined by utilizing existing resources of the memory device, or by adding a new module to detect whether the comparison signal is toggled. When the comparison signal is toggled (operation S205: Yes), an enable signal that is activated may be outputted (operation S210), and the voltage level of the reference voltage may be stored based on activation of the enable signal (operation S220), after which the operation S200 may end. When the comparison signal is not toggled (operation S205: No), operation S200 may end without outputting an enable signal and without storing the voltage level of the reference voltage (i.e., operations S210 and S220 are bypassed).

Referring to FIG. 6, operations S205, S210, S220 and S230 may be an example implementation of operation S200 in FIG. 1, according to another embodiment. In FIG. 6, operations S205, S210, and S220 are substantially the same as those described with reference to FIG. 5, and descriptions repeated with those of FIG. 5 will be omitted. Operation S230 may be additionally performed after operation S220. When the comparison signal is toggled (operation S205: Yes), a toggle count may increase by one (operation S230). For example, an operation of increasing the toggle count may be performed by a counter circuit. Using the toggle count, it may be confirmed whether the operation of storing the voltage level of the reference voltage (e.g., operation S200 in FIG. 1) has been performed N times, where N is a function of the toggle count. Obtaining N voltage levels of the reference voltage using the toggle count will be described in detail with reference to FIG. 7.

Figure 7:
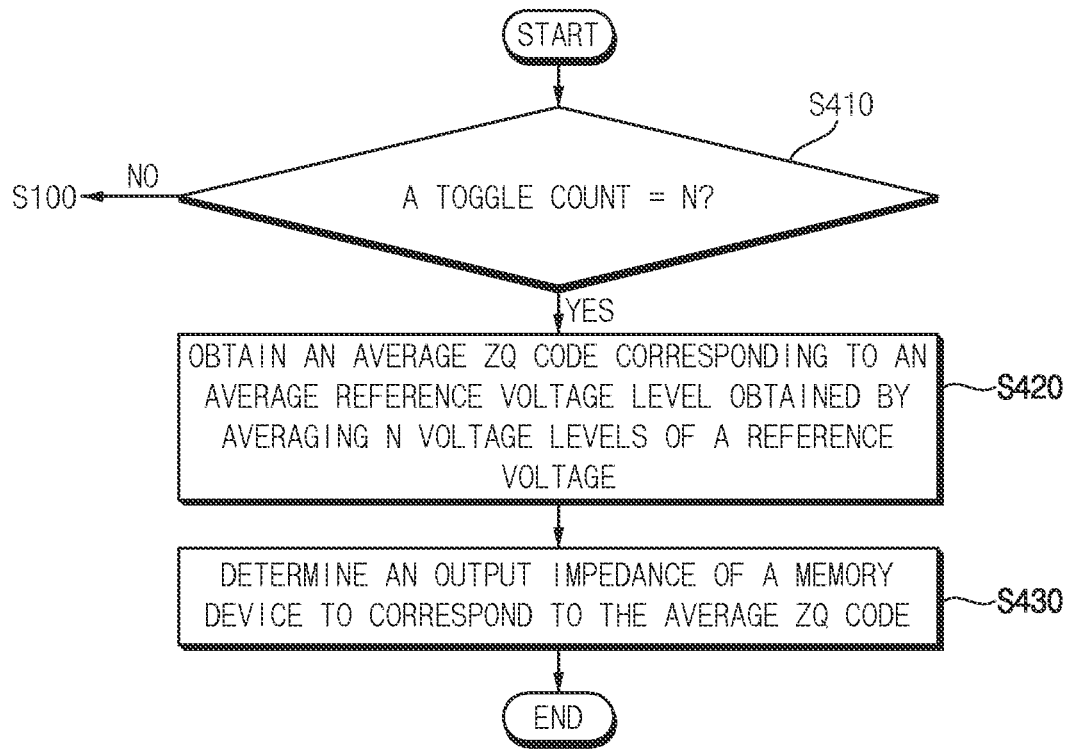
FIG. 7 is a flowchart illustrating an example of calibrating an output impedance of a memory device based on an average ZQ code in a method of calibrating impedance of a memory device according to example embodiments.

FIG. 7 is a flowchart illustrating an example of calibrating an output impedance of a memory device based on an average ZQ code in a method of calibrating impedance of a memory device according to example embodiments.

Referring to FIG. 7, operations S410, S420, and S430 may be an example implementation of operation S400 in FIG. 1.

Whether the toggle count is equal to N (where N may be indicative of a prescribed threshold number of times for storing the voltage level of the reference voltage) may be determined (operation S410). When the toggle count is less than N (operation S410: No), operations of outputting the comparison signal (operation S100 in FIG. 1), storing the voltage level of the reference voltage (operation S200 in FIG. 1), and adjusting the reference voltage, until the toggle count is equal to N (operation S300 in FIG. 1) may be performed. When the toggle count is equal to N (operation S410: Yes), the average ZQ code corresponding to the average reference voltage level obtained by averaging the N voltage levels of the reference voltage may be obtained (operation S420), and the output impedance of the memory device that corresponds to the average ZQ code may be determined (operation S430), after which the operation S400 may end. For example, averaging the N voltage levels of the reference voltage may be an operation of selecting one of the N stored voltage levels of the reference voltage. For example, if N is 3 and the stored voltage levels of the reference voltage are about 1.2V, 1.4V, and 1.6V, the operation of averaging the three stored voltage levels of the reference voltage may be an operation of selecting the 1.4V among the three stored voltage levels of the reference voltage. In this case, an average reference voltage level may be about 1.4V, and an average ZQ code may be obtained as a ZQ code corresponding to the average reference voltage level 1.4V.

For example, if the voltage level of the reference voltage is adjusted in 0.1V increments, N is 3, and the stored voltage levels of the reference voltage are about 1.2V, 1.4V, and 1.4V, the operation of averaging the three stored voltage levels of the reference voltage may be an operation of calculating 1.3V. 1.3V may be the reference voltage level closest to 1.33V, and 1.33V may be an arithmetic average of the three stored voltage levels of the reference voltage. In this case, the average reference voltage level may be 1.3V, and the average ZQ code may be obtained as a ZQ code corresponding to the average reference voltage level 1.3V. As N increases, a voltage drop level that occurs when driving a data transmitter of a memory device may be accurately detected.

Figure 8:
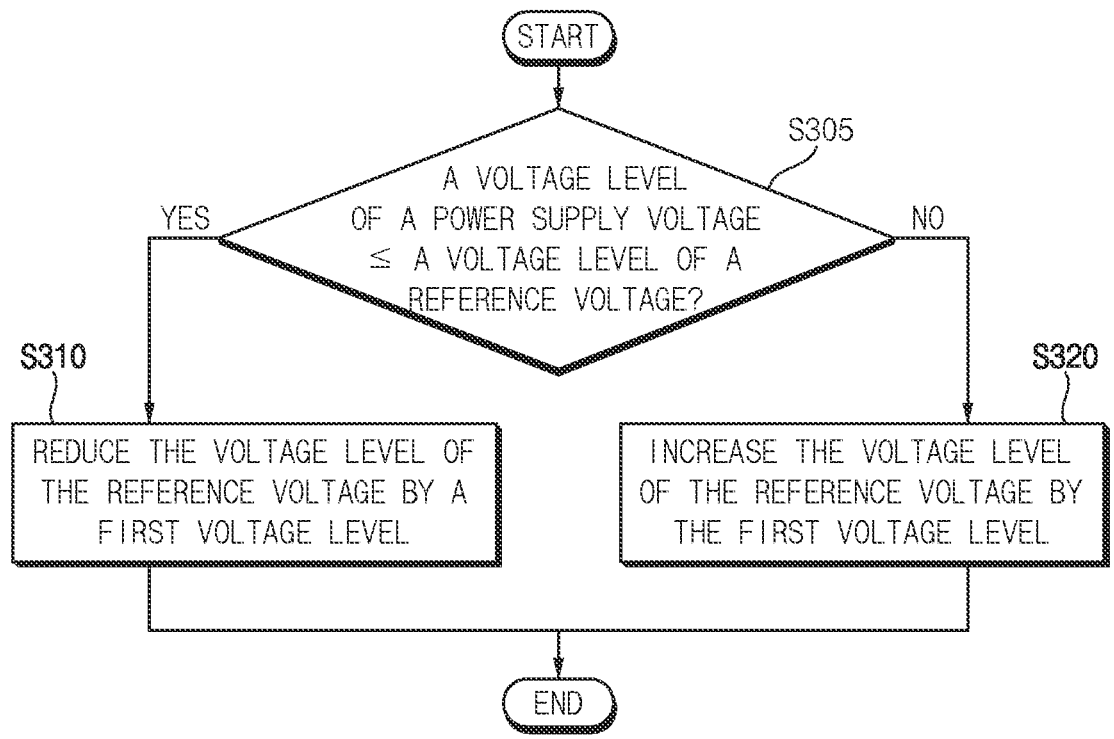
FIG. 8 is a flowchart illustrating an example of adjusting reference voltage in a method of calibrating impedance of a memory device according to example embodiments.

FIG. 8 is a flowchart illustrating an example of adjusting the reference voltage in a method of calibrating impedance of a memory device according to example embodiments.

Referring to FIG. 8, operations S305, S310 and S320 may be an example implementation of operation S300 in FIG. 1.

When the voltage level of the power supply voltage is less than or equal to the voltage level of the reference voltage (operation S305: Yes), the voltage level of the reference voltage may be reduced by a first voltage level (operation S310), after which the operation S300 may end. When the voltage level of the power supply voltage is greater than the voltage level of the reference voltage (operation S305: No), the voltage level of the reference voltage may be increased by the first voltage level (operation S320), after which the operation S300 may end. The first voltage level may be set arbitrarily. As the first voltage level gets smaller, a voltage drop level that occurs when driving a data transmitter of a memory device may be detected more accurately. For example, if the voltage drop level that occurs when driving the data transmitter of the memory device is expected to be about 100 mV, the first voltage level may be set to 10 mV, or 5 mV, or etc. For example, if the voltage drop level that occurs when driving the data transmitter of the memory device is actually 95 mV, the voltage drop level may be detected more accurately in a case of the first voltage level being 5 mV than in a case of the first voltage level being 10 mV.

Figure 9:
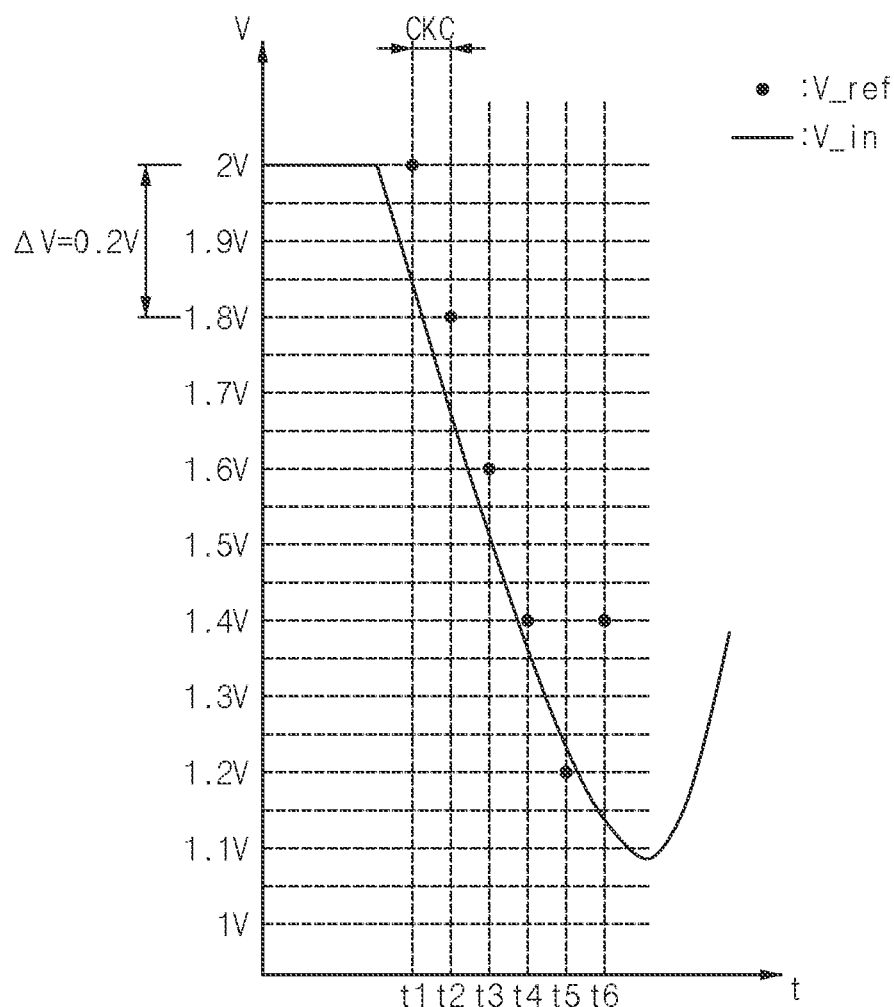
FIG. 9 is a diagram for describing adjusting reference voltage in a method of calibrating impedance of a memory device according to example embodiments.

FIG. 9 is a diagram for describing adjusting a reference voltage in a method of calibrating impedance of a memory device according to example embodiments.

Referring to FIG. 9, an operation of adjusting a reference voltage V_ref based on a comparison signal C_Result may be illustrated. As a result of comparing the voltage level of the reference voltage V_ref and a voltage level of a power supply voltage V_in at a first time point t1, the comparison signal C_Result may have a first logic level "0". Since the comparison signal C_Result at the first time point t1 has the first logic level "0", the reference voltage V_ref at the second time point t2 may be reduced by a first voltage level ΔV (which may be 200 mV, although embodiments are not limited thereto), resulting in the reference voltage V_ref being adjusted to about 1.8V. Similarly, the comparison signal C_Result at second, third, and fourth time points t2, t3, and t4 has the first logic level "0", since the reference voltage V_ref is determined to be greater than the power supply voltage V_in at each of these time points, the reference voltage V_ref at the third, fourth, and fifth time points t3, t4, and t5 may be reduced by the first voltage level ΔV. However, at the fifth time point t5, since the comparison signal C_Result has the second logic level "1," indicative of the reference voltage V_ref being less than or equal to the power supply voltage V_in, the reference voltage V_ref at the sixth time point t6 may be increased by the first voltage level ΔV, resulting in the reference voltage V_ref being adjusted to about 1.4V. For example, an operation of adjusting the reference voltage V_ref based on the comparison signal C_Result may be performed every clock cycle CKC.

Figure 10:
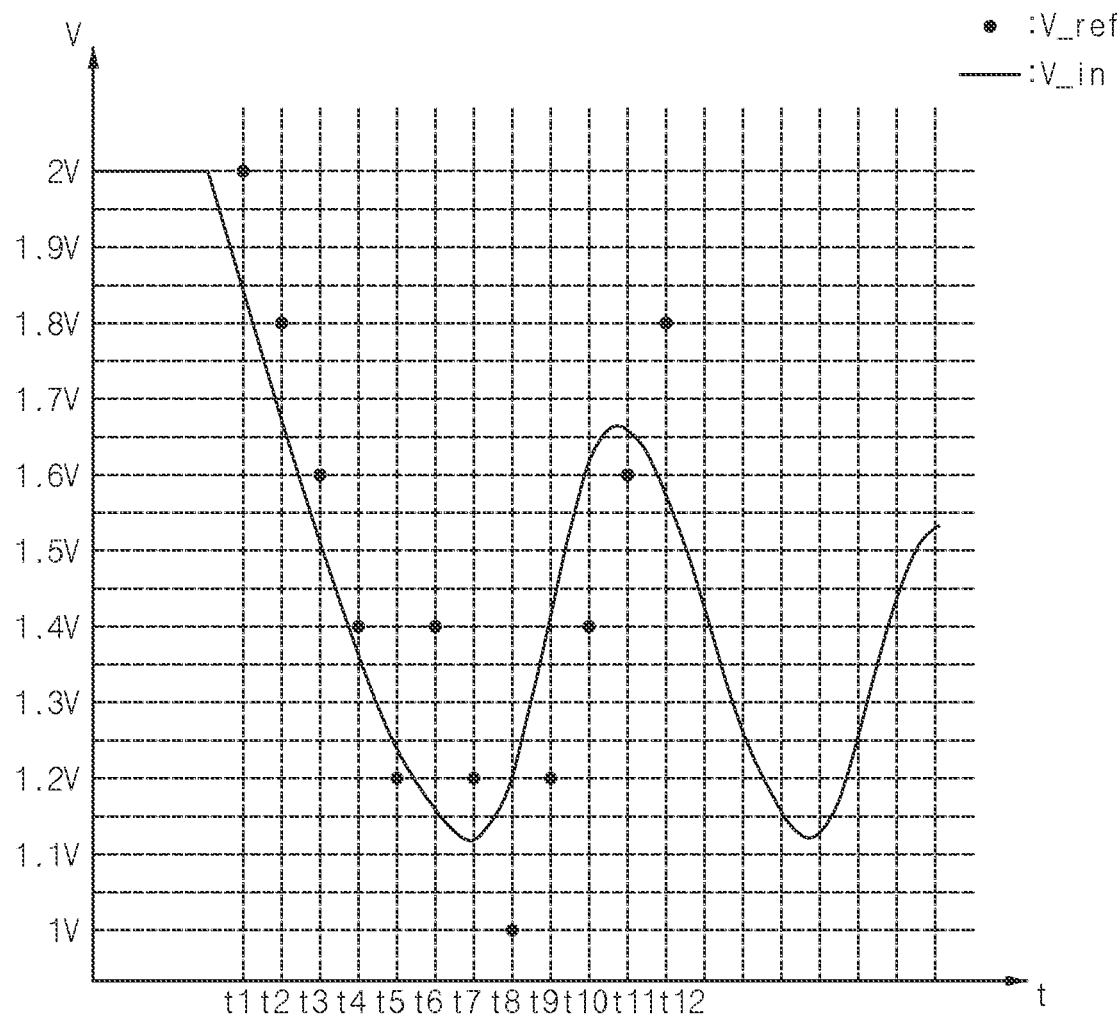
FIG. 10 is a diagram for describing obtaining an average ZQ code in a method of calibrating impedance of a memory device according to example embodiments.

FIG. 10 is a diagram for describing obtaining an average ZQ code in a method of calibrating impedance of a memory device according to example embodiments. Descriptions repeated with those of FIGS. 4 and 9 will be omitted.

Referring to FIG. 10, in a case where a comparison signal C_Result is toggled, an operation of storing a voltage level of a reference voltage V_ref, an operation of increasing a toggle count Tog_CNT by one, and an operation of calculating an average ZQ code Code_avg using a stored voltage level of the reference voltage Saved_V_ref may be illustrated.

The comparison signal C_Result at a first time point t1 may have a first logic level "0," indicative of the reference voltage V_ref being greater than the power supply voltage V_in, and the comparison signal C_Result at a second time point t2 may have the first logic level "0". Since the comparison signal C_Result at the second time point t2 maintains the first logic level "0" from the first time point t1 (i.e., the comparison signal C_Result is not toggled), the operation of storing the voltage level of the reference voltage V_ref and the operation of increasing the toggle count Tog_CNT by one may not be performed. Similarly, the operation of storing the voltage level of the reference voltage V_ref and the operation of increasing the toggle count Tog_CNT by one may not be performed until the comparison signal C_Result is output after the fourth time point t4.

The comparison signal C_Result at the fourth time point t4 may have a first logic level "0", and the comparison signal C_Result at the fifth time point t5 may have a second logic level "1," indicative of the reference voltage V_ref being less than or equal to the power supply voltage V_in. At this time, since the comparison signal C_Result at the fifth time point t5 changed from the first logic level "0" to the second logic level "1", this may indicate the case where the comparison signal C_Result has toggled. Thus, the previous voltage level (e.g., about 1.4V) of the reference voltage V_ref at the fourth time point t4 may be stored, and the toggle count Tog_CNT may be increased by one. Similarly, since the comparison signal C_Result was toggled at the sixth, eighth, and twelfth time points t6, t8, and t12, respectively, the voltage levels (e.g., about 1.2V, 1.2V, 1.6V) of the reference voltage V_ref at the fifth, seventh and eleventh time points t5, t7, and t11, respectively, may be stored, and the toggle count Tog_CNT may be increased by one. For example, when N is 4, an average reference voltage level may be calculated by averaging the stored reference voltage levels (e.g., about 1.4V, 1.2V, 1.2V, 1.6V), and an average ZQ code may be calculated as a ZQ code corresponding to the average reference voltage level.

For example, in FIG. 10, the stored voltage level of the reference voltage Saved_V_ref may be the voltage level (e.g., about 1.4V) of the reference voltage V_ref at the fourth time point t4, but the stored voltage level of the reference voltage Saved_V_ref may be the voltage level (e.g., about 1.2V) of the reference voltage V_ref at the fifth time point t5. That is, the stored voltage level of the reference voltage Saved_V_ref may be the voltage level of the reference voltage V_ref before being toggled, or may be the voltage level of the reference voltage V_ref after being toggled.

Figure 11:
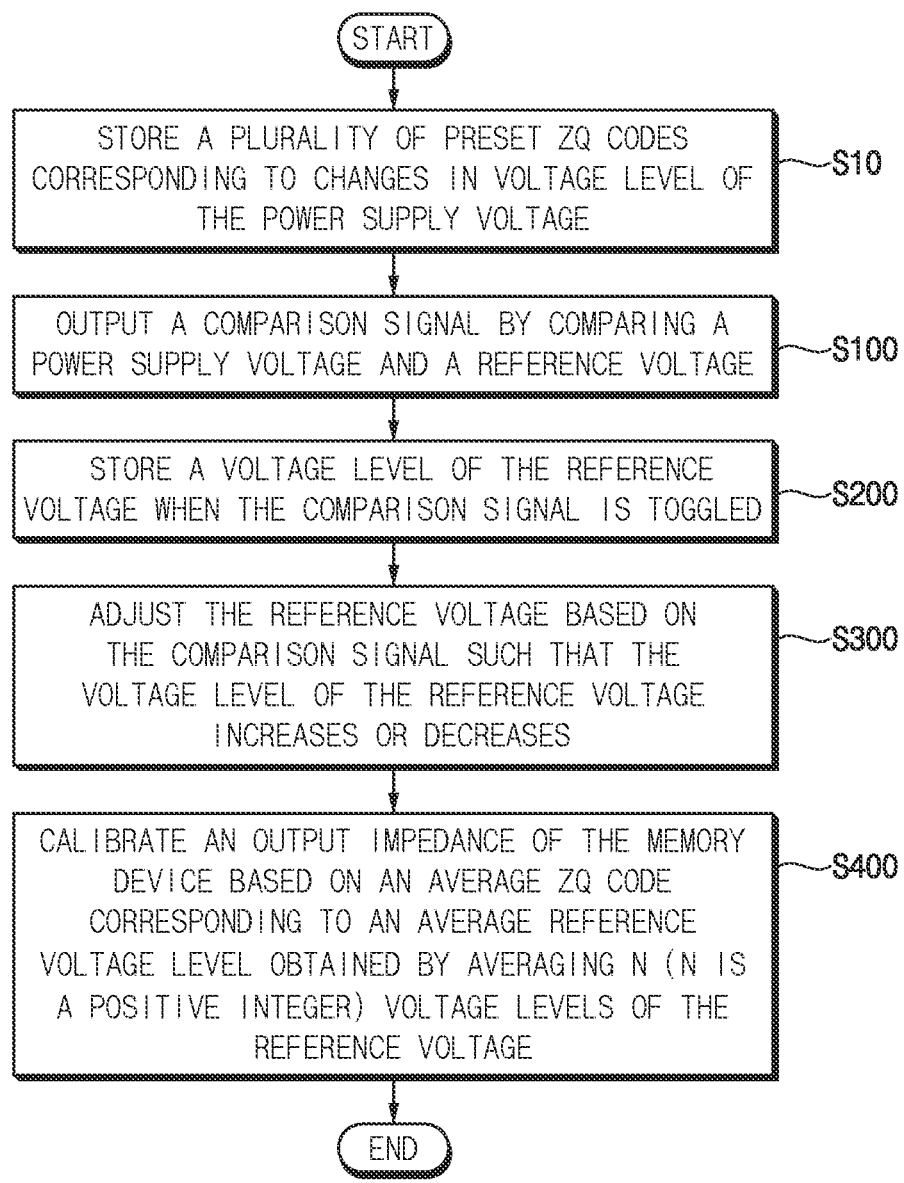
FIG. 11 is a flowchart illustrating a method of calibrating impedance of a memory device according to example embodiments.

FIG. 11 is a flowchart illustrating a method of calibrating impedance of a memory device according to example embodiments.

Referring to FIG. 11, operation S10 may be performed before operation S100, and operations S100, S200, S300, and S400 are substantially the same as those described with reference to FIG. 1, and descriptions repeated with those of FIG. 1 will be omitted.

A plurality of preset ZQ codes corresponding to changes in voltage level of the power supply voltage are stored (operation S10), before outputting a comparison signal by comparing the power supply voltage and the reference voltage (operation S100). Storing the plurality of preset ZQ codes will be described in detail with reference to FIGS. 13 and 14. For example, the preset ZQ code may represent a code for matching an impedance of a data transmitter and an impedance of a data receiver. For example, the preset ZQ code may represent a code that determines a strength of a driver of a memory device by controlling an on-off operation of a plurality of transistors. For example, the preset ZQ code may indicate an offset level of the code to reduce a size of a storage device. For example, the average ZQ code in FIG. 1 may be included in the plurality of preset ZQ codes.

Figure 12:
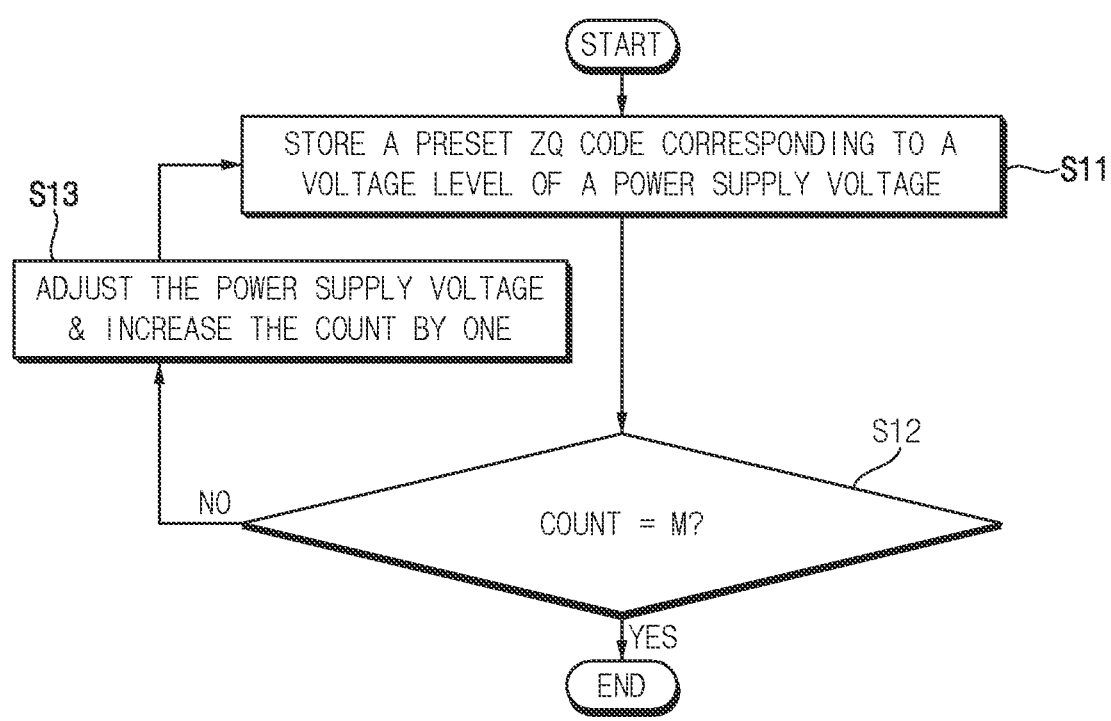
FIG. 12 is a flowchart illustrating an example of storing a plurality of preset ZQ codes in a method of calibrating impedance of a memory device according to example embodiments.

FIG. 12 is a flowchart illustrating an example of storing a plurality of preset ZQ codes in a method of calibrating impedance of a memory device according to example embodiments.

Referring to FIG. 12, operations S11, S12, and S13 may be an example implementation of operation S10 in FIG. 11.

The preset ZQ code corresponding to a voltage level of a power supply voltage may be stored (operation S11). For example, the voltage level of the power supply voltage may be set to the initial voltage level V0 in FIG. 2. After that, whether the count is equal to M may be determined (operation S12), where M is a positive integer indicative of a prescribed threshold. In this case, the count may be representative of the number of preset ZQ codes stored. If the count is equal to M (operation S12: Yes), operation S10 may end. If the count is not equal to M (operation S12: No), the power supply voltage may be adjusted and the count may be increased by one (operation S13), after which the method returns to operation S11 to store a preset ZQ code corresponding to the level of the adjusted power supply voltage. In this case, M different preset ZQ codes may be stored.

Figures 13, 14:
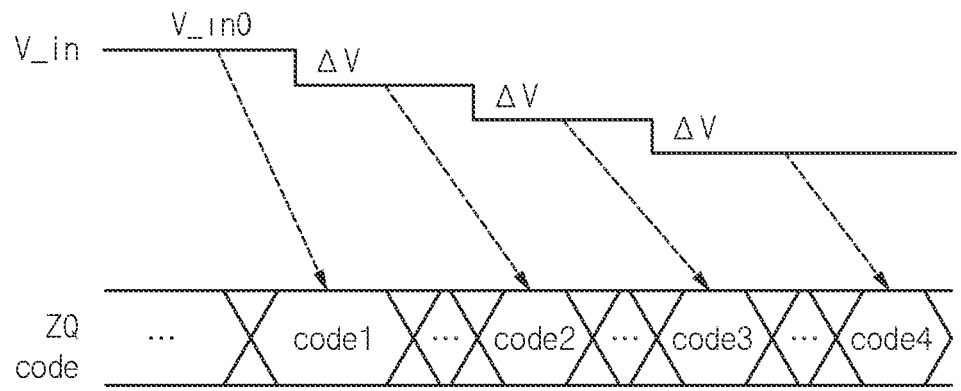
FIGS. 13 and 14 are diagrams for describing storing a plurality of preset ZQ codes in a method of calibrating impedance of a memory device according to example embodiments.

FIGS. 13 and 14 are diagrams for describing storing a plurality of preset ZQ codes in a method of calibrating impedance of a memory device according to example embodiments.

Referring to FIG. 13, an operation of adjusting a voltage level of a power supply voltage V_in by a first voltage level ΔV starting from an initial voltage level V_in0 and an operation of obtaining a plurality of preset ZQ codes, code 1, code 2, code 3, and code 4, corresponding to the voltage levels of the power supply voltage V_in, during a ZQ calibration operation of a memory device may be illustrated. For example, the initial voltage level V_in0 may be substantially the same as the initial voltage level V0 in FIG. 2. For example, the first voltage level ΔV may be substantially the same as the first voltage level ΔV in FIG. 9. In some example embodiments, ZQ codes may be obtained by adjusting the power supply voltage V_in not only to a constant voltage level but also to different voltage levels; that is, the voltage level ΔV used to adjust the voltage level of the power supply voltage may vary during the ZQ calibration operation.

Referring to FIG. 14, M different preset ZQ codes code 1, code 2, . . . , code m stored as a look-up table may be illustrated. The M different preset ZQ codes code 1, code 2, . . . , code m may correspond to M voltage levels V_in0, V_in0−ΔV, . . . , V_in0−(m−1) ΔV of the power supply voltage V_in. For example, the M different preset ZQ codes code 1, code 2, . . . , code m may be stored in a storage device as various forms, including the lookup table.

Figure 15:
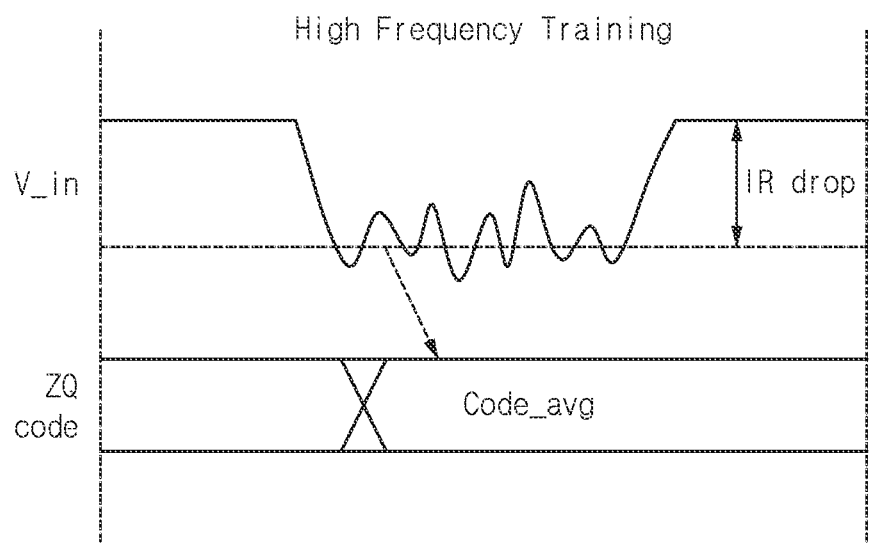
FIGS. 15 and 16 are diagrams illustrating non-limiting applications where a method of calibrating impedance of a memory device according to example embodiments may be implemented.
Figure 16:
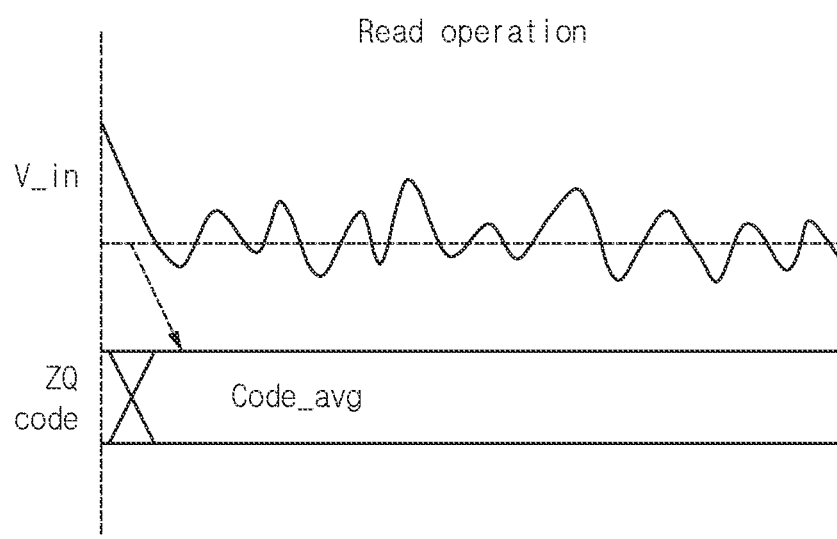

FIGS. 15 and 16 are diagrams illustrating examples of a method of calibrating impedance of a memory device according to example embodiments may be implemented.

Referring to FIG. 15, an example of adjusting an output impedance of a memory device using an average ZQ code Code_avg when a voltage drop occurs in the power supply voltage V_in supplied to a data transmitter may be illustrated. A method of calibrating impedance of a memory device according to example embodiments may be executed while the memory device performs a training operation, although embodiments are not limited thereto. The training operation may represent an operation of setting up the memory device (e.g., initialization process) so that the memory device may operate normally in a power-up state. For example, the training operation may be high frequency training. For example, the training operation may include setting up a duty-cycle corrector (DCC) and a delay-locked loop (DLL).

Referring to FIG. 16, another example of adjusting an output impedance of a memory device using an average ZQ code Code_avg when a voltage drop occurs in the power supply voltage V_in supplied to a data transmitter may be illustrated. A method of calibrating impedance of a memory device according to example embodiments may be executed while the memory device performs a read operation. The read operation represents only an example of a high-speed operation, and if the data transmitter is driven at high speed even before performing the read operation, a voltage drop may be detected. For example, the high-speed operation may include a Built-In Self Test (BIST) operation.

Figure 17:
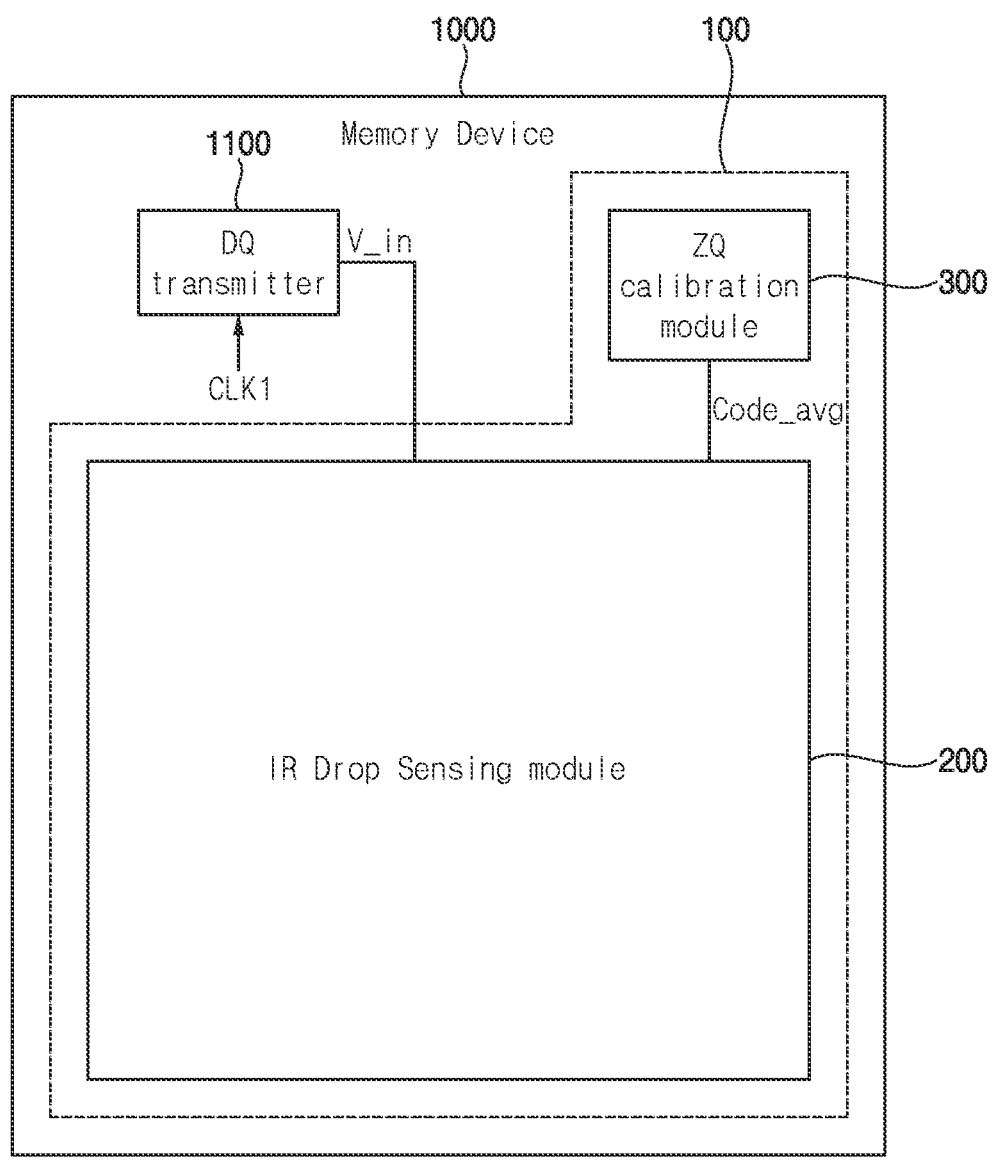
FIG. 17 is a schematic block diagram illustrating at least a portion of an impedance calibration circuit and a memory device including the impedance calibration circuit according to example embodiments.

FIG. 17 is a schematic block diagram illustrating at least a portion of an impedance calibration circuit and a memory device including the impedance calibration circuit according to example embodiments.

Referring to FIG. 17, a memory device 1000 includes a DQ (data) transmitter 1100 and an impedance calibration circuit 100.

In some example embodiments, the memory device 1000 may be a non-volatile memory device. A scheme of the memory device 1000 will be described with reference to FIG. 25.

The DQ transmitter 1100 may perform an operation of transmitting data when the memory device 1000 is driven. For example, the DQ transmitter 1100 may include a pre-driver that transmits data and an ivc driver (internal voltage down converter driver) that supplies voltage to the pre-driver. The power supply voltage supplied to the DQ transmitter 1100 may indicate a voltage of the pre driver supplied by the ivc driver. The DQ transmitter 1100 may operate based on a first clock signal CLK1.

The impedance calibration circuit 100 may include an IR drop sensing module 200 and a ZQ calibration module 300. The impedance calibration circuit 100 may be configured to adjust an output impedance of the memory device 1000. When the memory device 1000 performs a high-speed operation, an actual voltage level may be lower than a voltage level supplied by the ivc driver due to a current used for the high-speed operation. The impedance calibration circuit 100 may adjust the output impedance so that the actual voltage level is equal to the voltage level supplied by the ivc driver.

The IR drop sensing module 200 may obtain an average ZQ code Code_avg for the power supply voltage V_in supplied to the DQ transmitter 1100, and may transmit the average ZQ code Code_avg to the ZQ calibration module 300. A scheme of the IR drop sensing module 200 will be described with reference to FIG. 18.

The ZQ calibration module 300 may adjust the output impedance of the memory device based on the average ZQ code Code_avg obtained from the IR drop sensing module 200. For example, the ZQ calibration module 300 which performs an operation of adjusting the output impedance of the memory device based on the average ZQ code in FIG. 1, may be configured as will be described with reference to FIG. 24. For example, the ZQ calibration module 300 that performs an operation of storing a plurality of preset ZQ codes in FIG. 11 may have various example embodiments.

Figure 18:
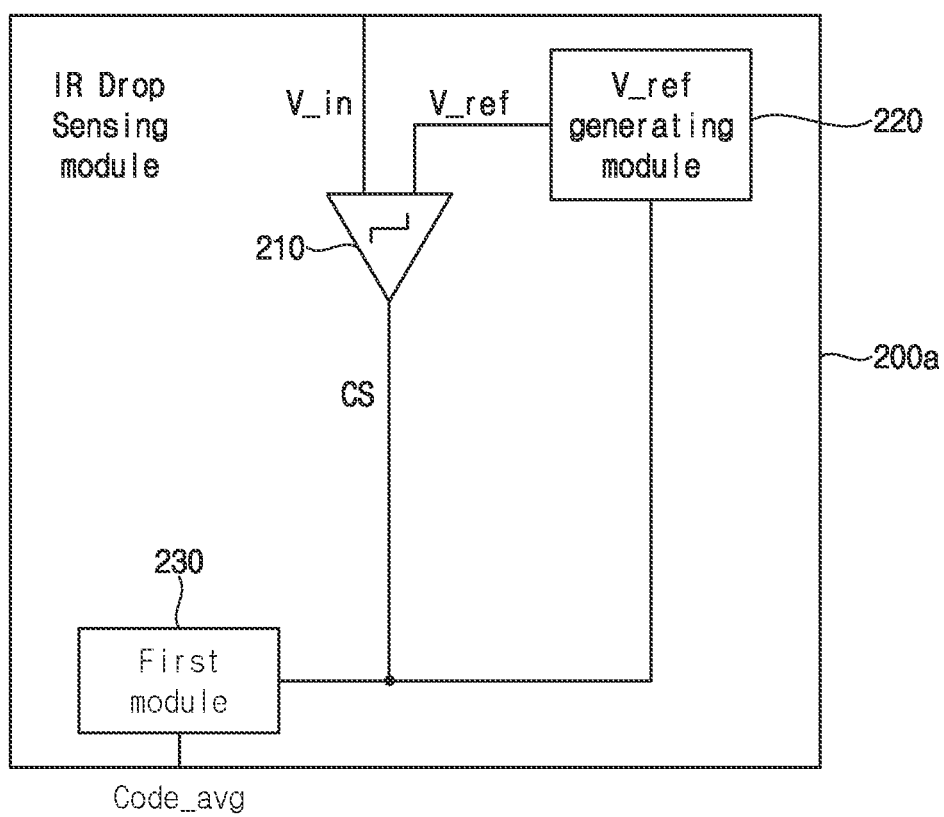
FIG. 18 is a schematic block diagram illustrating at least a portion of an IR drop sensing module that may be included in an impedance calibration circuit according to example embodiments.

FIG. 18 is a schematic block diagram illustrating at least a portion of an IR drop sensing module included in an impedance calibration circuit according to example embodiments.

Referring to FIG. 18, an IR drop sensing module 200a may be an example of the IR drop sensing module 200 in FIG. 17. The IR drop sensing module 200a includes a comparator 210, a reference voltage generator 220, and a first module 230.

The comparator 210 may compare a power supply voltage V_in, supplied to the IR drop sensing module 200a, and a reference voltage V_ref, generated by the reference voltage generator 220, and may output a comparison signal CS. For example, the power supply voltage V_in may be supplied to the data transmitter when the data transmitter is driven. The comparator 210 may be configured as an operational amplifier, and the comparison signal CS may be output as a logic low level or a logic high level.

The reference voltage generator 220 may generate the reference voltage V_ref and adjust the reference voltage V_ref based on the comparison signal CS such that a voltage level of the reference voltage V_ref increases or decreases. A scheme of the reference voltage generator 220 will be described with reference to FIG. 19.

The first module 230 may store the voltage level of the reference voltage V_ref when the comparison signal CS is toggled, and may obtain an average reference voltage level by averaging N (N is a positive integer) voltage levels of the reference voltage, and may calculate an average ZQ code corresponding to the average reference voltage level. For example, the N voltage levels of the reference voltage V_ref may be obtained by repeatedly performing operations of outputting the comparison signal CS by the comparator 210, storing the voltage level of the reference voltage V_ref by the first module 230, and adjusting the reference voltage by the reference voltage generator 220.

Figure 19:
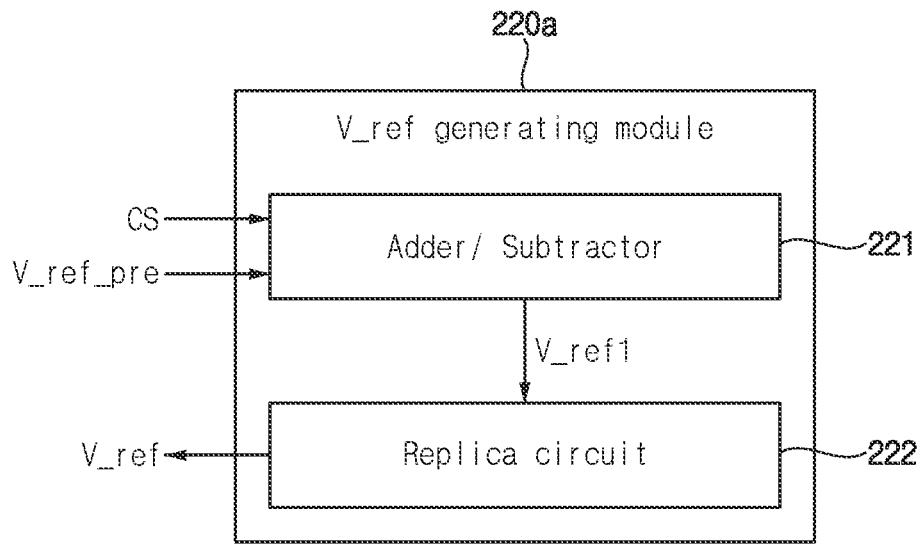
FIG. 19 is a schematic block diagram illustrating at least a portion of a reference voltage generator that may be included in an impedance calibration circuit according to example embodiments.

FIG. 19 is a schematic block diagram illustrating at least a portion of a reference voltage generator that may be included in an impedance calibration circuit according to example embodiments.

Referring to FIG. 19, a reference voltage generator 220a may be an example of the reference voltage generator 220 in FIG. 18. The reference voltage generator 220a may include an adder/subtractor 221 and a replica circuit 222.

The adder/subtractor 221 may generate a control voltage V_ref1 based on the comparison signal CS to increase or decrease a voltage level of a previous reference voltage V_ref_pre supplied to the add/subtractor 221 by a predetermined first voltage level. For example, the previous reference voltage V_ref_pre may represent the reference voltage V_ref before being adjusted by the reference voltage generator 220a. That is, the previous reference voltage V_ref_pre may represent a voltage one clock cycle before the reference voltage V_ref.

The replica circuit 222 may generate the reference voltage V_ref based on the control voltage V_ref1 generated by the adder/subtractor 221. For example, the reference voltage V_ref may represent a voltage after the previous reference voltage V_ref_pre is adjusted by the reference voltage generator 220a. For example, the reference voltage V_ref may represent a voltage one clock cycle after the previous reference voltage V_ref_pre. For example, the replica circuit 222 may have the same scheme (i.e., circuit configuration) as the power supply module that generates the power supply voltage supplied to the data transmitter (1100 in FIG. 17).

For example, a current supplied to the replica circuit 222 may have a very small value to prevent a voltage drop in a voltage supplied to the replica circuit 222.

Figure 20:
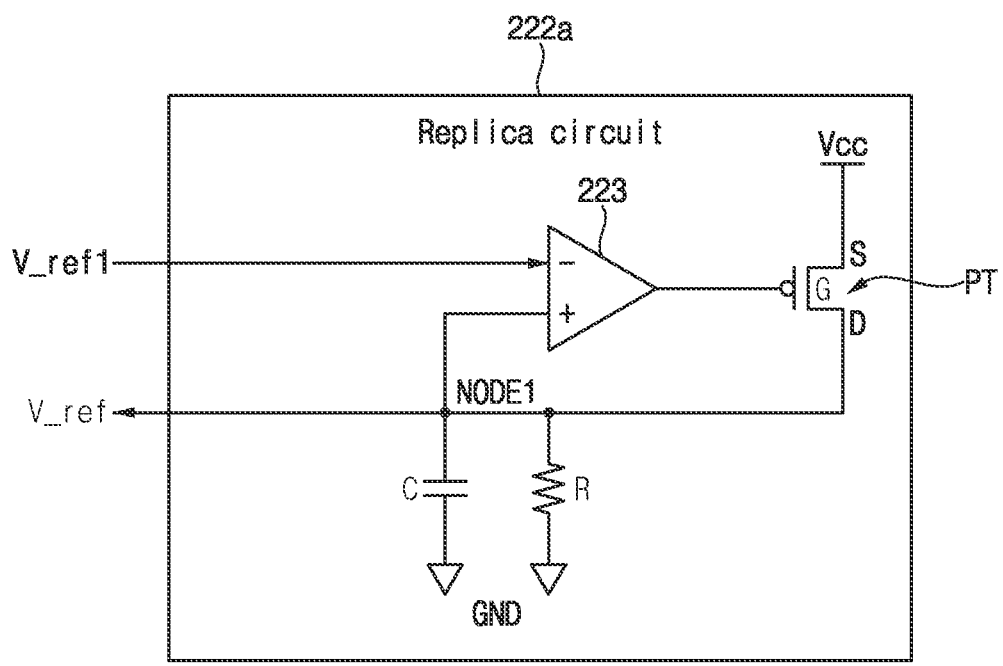
FIG. 20 is a schematic block diagram illustrating at least a portion of a replica circuit that may be included in an impedance calibration circuit according to example embodiments.

FIG. 20 is a schematic block diagram illustrating at least a portion of a replica circuit included in an impedance calibration circuit according to example embodiments.

Referring to FIG. 20, a replica circuit 222a may be an example of the replica circuit 222 in FIG. 19. The replica circuit 222a may include an operational amplifier 223, a transistor PT, a resistor R, and a capacitor C.

The operational amplifier 223 may include a first input terminal (−), which may be an inverting input, a second input terminal (+), which may be a non-inverting input, and an output terminal. The first input terminal (−) may receive a control voltage V_ref1. The second input terminal (+) may be connected to a first node NODE1 that outputs a reference voltage V_ref.

The transistor PT may include a gate (G) connected to the output terminal of the operational amplifier 223 and a drain (D) connected to the first node NODE1, and a source(S) receiving a reference supply voltage Vcc to generate the reference voltage V_ref. For example, the transistor PT may be a p-channel metal-oxide-semiconductor (PMOS) transistor, although embodiments are not limited thereto.

The resistor R and the capacitor C may be connected in parallel between the first node NODE1 and a ground terminal GND.

Figure 21:
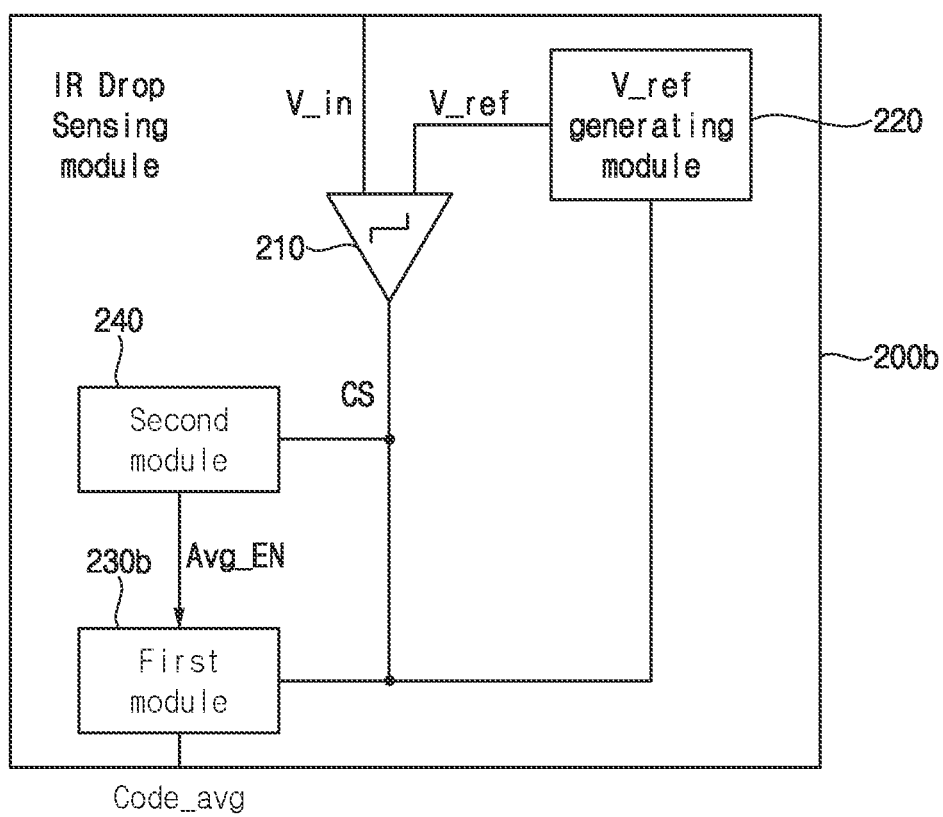
FIGS. 21, 22 and 23 are schematic block diagrams illustrating examples of an IR drop sensing module that may be included in an impedance calibration circuit according to example embodiments.
Figure 22:
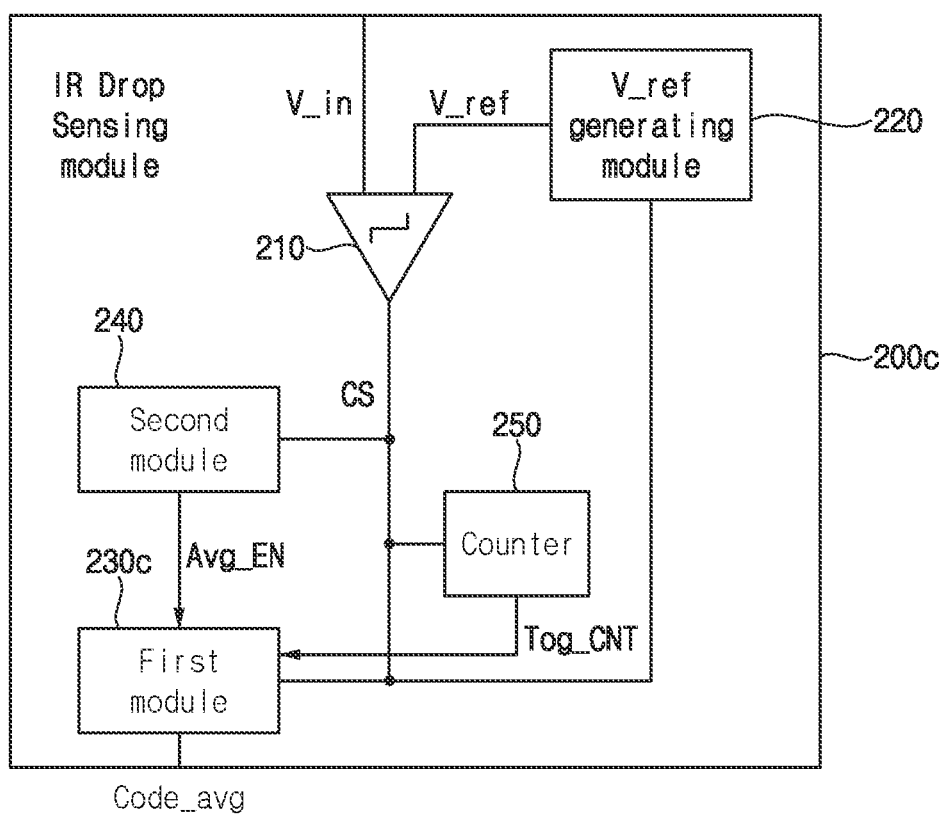
Figure 23:
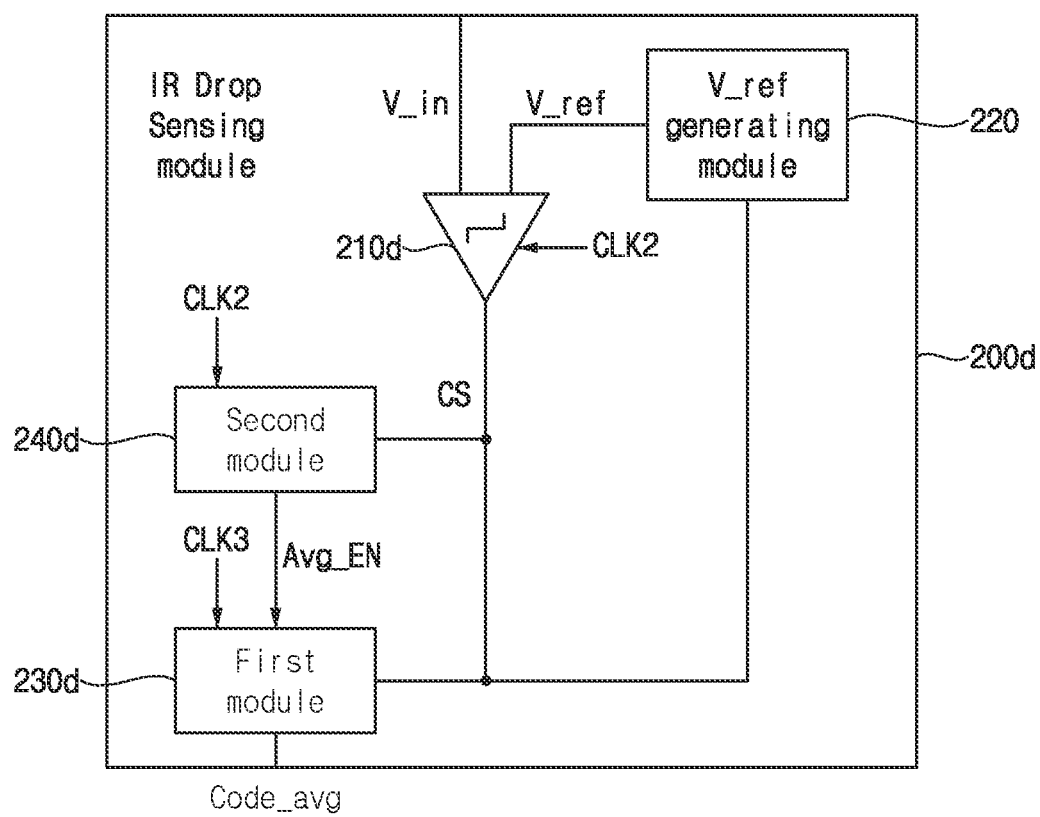

FIGS. 21, 22 and 23 are schematic block diagrams illustrating examples of an IR drop sensing module that may be included in an impedance calibration circuit according to example embodiments.

Referring to FIG. 21, an IR drop sensing module 200b may be an example implementation of the IR drop sensing module 200 in FIG. 17. The IR drop sensing module 200b may include a comparator 210, a reference voltage generator 220, a first module 230b, and a second module 240. The comparator 210 and the reference voltage generator 220 are substantially the same as those described with reference to FIG. 18, and descriptions repeated with those of FIG. 18 will be omitted.

The second module 240 may output an enable signal Avg_EN that is activated when a comparison signal CS is toggled. For example, the second module 240 may be configured with a circuit that detects dithering of the comparison signal CS.

The first module 230b may store a voltage level of a reference voltage V_ref based on activation of the enable signal Avg_EN output from the second module 240 and may calculate the average ZQ code Code_avg.

Referring to FIG. 22, an IR drop sensing module 200c may be an example implementation of the IR drop sensing module 200 in FIG. 17. The IR drop sensing module 200c may include a comparator 210, a reference voltage generator 220, a first module 230c, a second module 240, and a counter circuit 250. The comparator 210, reference voltage generator 220, and second module 240 are substantially the same as those described with reference to FIGS. 18 and 21, and descriptions repeated with those of FIGS. 18 and 21 will be omitted.

When a comparison signal CS is toggled, the counter circuit 250 may increase a toggle count Tog_CNT by one. The counter circuit 250 is only an example of a configuration for storing N (N is a natural number) voltage levels of the reference voltage, and may be implemented in various ways.

When the toggle count Tog_CNT output from the counter circuit 250 is equal to a prescribed threshold N, the first module 230c may obtain an average ZQ code by averaging the N stored voltage levels of the reference voltage.

Referring to FIG. 23, an IR drop sensing module 200d may be an example implementation of the IR drop sensing module 200 in FIG. 17. The IR drop sensing module 200d may include a comparator 210d, a reference voltage generator 220, a first module 230d, and a second module 240d. The reference voltage generator 220 is substantially the same as those described with reference to FIG. 18, and descriptions repeated with those of FIG. 18 will be omitted.

The comparator 210d and the second module 240d may operate based on a second clock signal CLK2 having a lower frequency than the first clock signal CLK1 in FIG. 17. The second clock signal CLK2 may be generated, for example, via a clock divider that generates a clock signal that has a k (k is a positive integer of 2 or more) multiple of a basic clock period. For example, the second clock signal CLK2 may have a k multiple of the clock period of the first clock signal CLK1 in FIG. 17.

The first module 230d may operate based on the third clock signal CLK3, which has a lower frequency than the first clock signal CLK1 in FIG. 17. Like the second clock signal CLK2, the third clock signal CLK3 may also be generated through the clock divider. The third clock signal CLK3 may have a k multiple of the clock period of the second clock signal CLK2. In this regard, the IR drop sensing module 200d may be a synchronous (i.e., clocked) implementation of the example IR drop sensing module 200b shown in FIG. 21.

Figure 24:
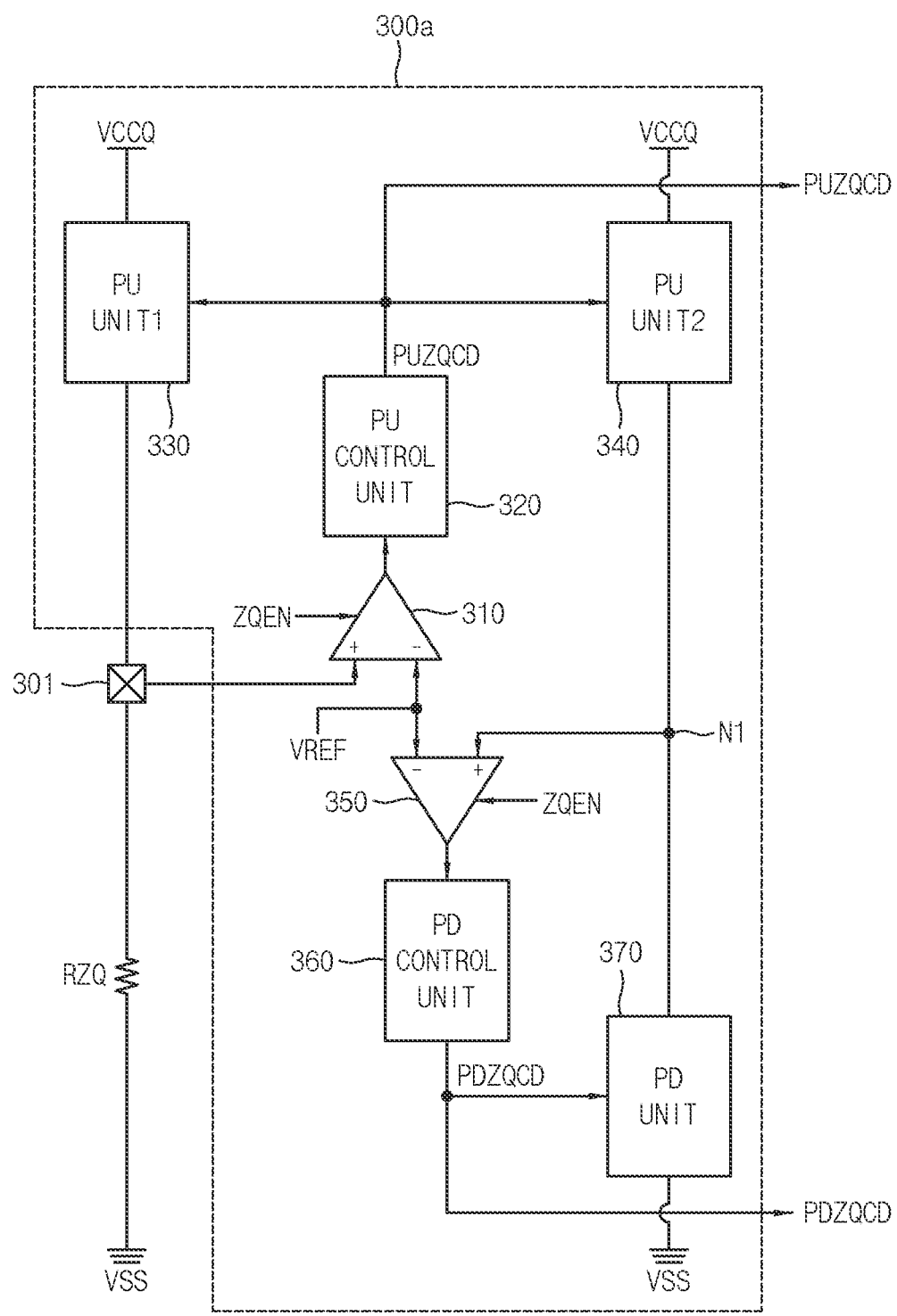
FIG. 24 is a schematic block diagram illustrating at least a portion of a ZQ calibration module that may be included in an impedance calibration circuit according to example embodiments.

FIG. 24 is a schematic block diagram illustrating at least a portion of a ZQ calibration module that may be included in an impedance calibration circuit according to example embodiments.

Referring to FIG. 24, a ZQ calibration module 300a may be a general example of a circuit configuration that calibrates an impedance of a memory device. The ZQ calibration module 300a may be an example implementation of the ZQ calibration module 300 in FIG. 17. The ZQ calibration module 300a may include a first comparison unit (e.g., comparator) 310, a pull-up (PU) control unit 320, a first pull-up unit 330, a second pull-up unit 340, a second comparison unit 350, a pull-down (PD) control unit 360 and a pull-down unit 370.

The first pull-up unit 330 may be connected between a power supply voltage VCCQ and the ZQ terminal 301. The external resistor RZQ may be connected between the ZQ terminal 301 and a ground voltage VSS. In other words, the first pull-up unit 330 and the external resistor RZQ may be connected in series between the power supply voltage VCCQ and the ground voltage VSS. The second pull-up unit 340 may be connected between the power supply voltage VCCQ and a first node N1. The pull-down unit 370 may be connected between the first node N1 and the ground voltage VSS. In other words, the second pull-up unit 340 and the pull-down unit 370 may be connected in series between the power supply voltage VCCQ and the ground voltage VSS.

The first comparison unit 310 may compare a voltage at the ZQ terminal 301 with a reference voltage VREF based on the impedance calibration enable signal ZQEN. For example, the reference voltage VREF may correspond to a half of the power supply voltage VCCQ (e.g., VCCQ/2).

The pull-up control unit 320 and the first pull-up unit 330 may perform the pull-up impedance calibration operation based on an output of the first comparison unit 310. For example, the pull-up control unit 320 may generate the pull-up calibration code PUZQCD based on the output of the first comparison unit 310, and an impedance of the first pull-up unit 330 may be adjusted (i.e., controlled) based on the pull-up calibration code PUZQCD. The pull-up calibration code PUZQCD may be changed until the voltage at the ZQ terminal 301 becomes substantially the same as the reference voltage VREF.

The second pull-up unit 340 may have a configuration which is substantially the same as that of the first pull-up unit 330. An impedance of the second pull-up unit 340 may be adjusted based on the pull-up calibration code PUZQCD (e.g., the final pull-up calibration code). Thus, the impedance of the second pull-up unit 340 may be substantially the same as the impedance of the first pull-up unit 330.

The second comparison unit 350 may compare a voltage at the first node N1 with the reference voltage VREF based on the impedance calibration enable signal ZQEN.

The pull-down control unit 360 and the pull-down unit 370 may perform the pull-down impedance calibration operation based on an output of the second comparison unit 350. For example, the pull-down control unit 360 may generate the pull-down calibration code PDZQCD based on the output of the second comparison unit 350, and an impedance of the pull-down unit 370 may be adjusted based on the pull-down calibration code PDZQCD. The pull-down calibration code PDZQCD may be changed until the voltage at the first node N1 becomes substantially the same as the reference voltage VREF.

Although not illustrated in FIG. 24, each of the first pull-up unit 330, the second pull-up unit 340 and the pull-down unit 370 may include a plurality of transistors that are connected in parallel to each other and are selectively turned on based on the pull-up calibration code PUZQCD or the pull-down calibration code PDZQCD. According to example embodiments, each of the first pull-up unit 330, the second pull-up unit 340 and the pull-down unit 370 may further include a plurality of resistors that are connected to the plurality of transistors. In addition, although not illustrated in FIG. 24, the ZQ calibration module 300a may further include a reference voltage generation unit that generates the reference voltage VREF; alternatively, the reference voltage VREF may be supplied to the ZQ calibration module 300a from an external reference voltage source.

Figure 25:
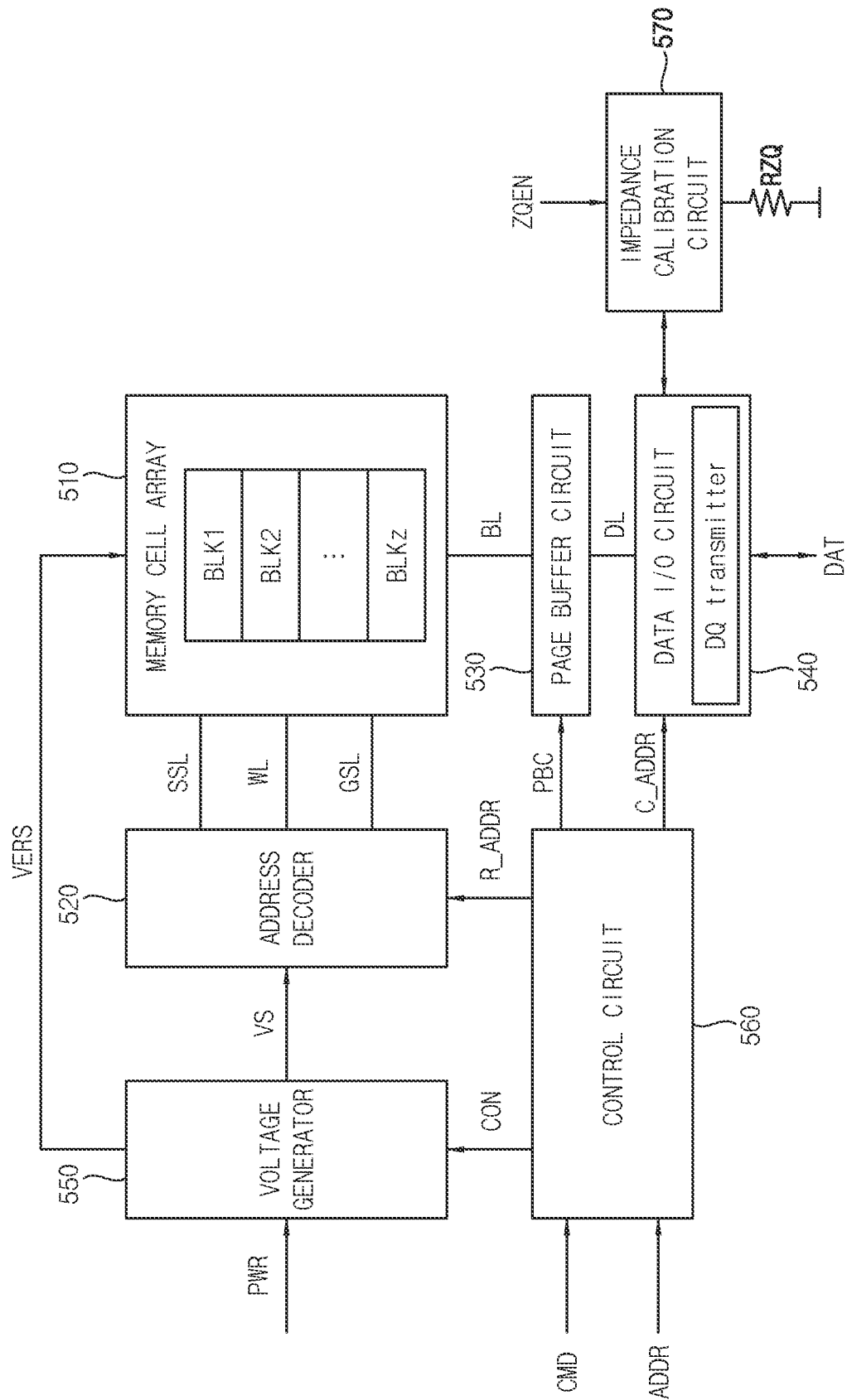
FIG. 25 is a schematic block diagram illustrating at least a portion of a memory device according to example embodiments.

FIG. 25 is a schematic block diagram illustrating at least a portion of a memory device according to example embodiments.

Referring to FIG. 25, a memory device 1000a may be an example implementation of the memory device 1000 in FIG. 17. The memory device 1000a may include a memory cell array 510, an address decoder 520, a page buffer circuit 530, a data input/output (I/O) circuit 540, a voltage generator 550, a control circuit 560 and an impedance calibration circuit 570. The data I/O circuit 540 may include the DQ transmitter 1100 in FIG. 17, and the impedance calibration circuit 570 may be substantially the same as the impedance calibration circuit 100 in FIG. 17.

The memory cell array 510 is connected to the address decoder 520 via a plurality of string selection lines SSL, a plurality of wordlines WL and a plurality of ground selection lines GSL. The memory cell array 510 is further connected to the page buffer circuit 530 via a plurality of bitlines BL. The memory cell array 510 may include a plurality of memory cells (e.g., a plurality of nonvolatile memory cells) that are connected to the plurality of wordlines WL and the plurality of bitlines BL. The memory cell array 510 may be divided into a plurality of memory blocks BLK1, BLK2, . . . , BLKz each of which includes memory cells. In addition, each of the plurality of memory blocks BLK1, BLK2, . . . , BLKz may be divided into a plurality of pages.

The control circuit 560 receives a command CMD and an address ADDR from an external source (e.g., from a memory controller), and is configured to control erasure, programming and read operations of the memory device 1000a based on the command CMD and the address ADDR. An erasure operation may include performing a sequence of erase loops, and a program operation may include performing a sequence of program loops. Each program loop may include a program operation and a program verification operation. Each erase loop may include an erase operation and an erase verification operation. The read operation may include a normal read operation and data recover read operation.

For example, the control circuit 560 may generate control signals CON, which are used for controlling the voltage generator 550, and may generate control signal PBC for controlling the page buffer circuit 530, based on the command CMD, and may generate a row address R_ADDR and a column address C_ADDR based on the address ADDR. The control circuit 560 may provide the row address R_ADDR to the address decoder 520 and may provide the column address C_ADDR to the data I/O circuit 540. In an embodiment, the control circuit 560 may generate switch control signals for controlling the impedance calibration circuit 570. As described above with reference to FIGS. 1 to 24, the switch control signals may include the first to fourth impedance control signals associated with the first to fourth impedance calibration operations, respectively.

The address decoder 520 may be connected to the memory cell array 510 via the plurality of string selection lines SSL, the plurality of wordlines WL and the plurality of ground selection lines GSL.

The voltage generator 550 may generate voltages VS that are required for an operation of the memory device 1000a based on a power signal PWR and the control signals CON supplied to the voltage generator 550. The voltages VS may be applied to the plurality of string selection lines SSL, the plurality of wordlines WL and the plurality of ground selection lines GSL via the address decoder 520. The voltage generator 550 may further generate an erase voltage VERS supplied to the memory cell array 510 that is required for the data erase operation based on the power PWR and the control signals CON. The erase voltage VERS may be applied to the memory cell array 510 directly or via the bitlines BL.

The page buffer circuit 530 may be connected to the memory cell array 510 via the plurality of bitlines BL. The page buffer circuit 530 may include a plurality of page buffers. In some example embodiments, each page buffer may be connected to one corresponding bitline. In some example embodiments, each page buffer may be connected to two or more bitlines.

The page buffer circuit 530 may store data DAT to be programmed into the memory cell array 510 or may read data DAT sensed from the memory cell array 510. In other words, the page buffer circuit 530 may operate as a write driver or a sensing amplifier according to an operation mode of the memory device 1000a.

The data I/O circuit 540 may include the DQ transmitter 1100 in FIG. 17, and may include a pre-driver for transmitting data and an ivc driver (internal voltage down converter driver) for supplying voltage to the pre-driver. The data I/O circuit 540 may be connected to the page buffer circuit 530 via data lines DL. The data I/O circuit 540 may provide the data DAT from outside of the memory device 1000a to the memory cell array 510 via the page buffer circuit 530 or may provide the data DAT from the memory cell array 510 to the outside of the memory device 1000a, based on the column address C_ADDR.

The impedance calibration circuit 570 may be connected to the data I/O circuit 540, may be connected to an external resistor RZQ, and may perform an impedance calibration operation on a data I/O terminal (or pin) included in the data I/O circuit 540 based on an impedance calibration enable signal ZQEN. For example, the control circuit 560 may generate the impedance calibration enable signal ZQEN based on an impedance calibration command.

The impedance calibration circuit 570 may perform the method of calibrating impedance according to example embodiments described with reference to FIGS. 1 through 16.

The inventive concept may be applied to various electronic devices and systems that include the memory devices. For example, the inventive concept may be applied to systems such as a personal computer (PC), a server computer, a data center, a workstation, a mobile phone, a smart phone, a tablet computer, a laptop computer, a personal digital assistant (PDA), a portable multimedia player (PMP), a digital camera, a portable game console, a music player, a camcorder, a video player, a navigation device, a wearable device, an internet of things (IoT) device, an internet of everything (IoE) device, an e-book reader, a virtual reality (VR) device, an augmented reality (AR) device, a robotic device, a drone, etc.

The foregoing is illustrative of example embodiments and is not to be construed as limiting thereof. Although some example embodiments have been described, those skilled in the art will readily appreciate that many modifications are possible in the example embodiments without materially departing from the novel teachings and advantages of the example embodiments. Accordingly, all such modifications are intended to be included within the scope of the example embodiments as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. A method of calibrating impedance of a memory device including a data transmitter, the method comprising:
   outputting a comparison signal by comparing a power supply voltage and a reference voltage, the power supply voltage being supplied to the data transmitter when the data transmitter is driven;
   storing a voltage level of the reference voltage when the comparison signal changes from a first logic level to a second logic level;
   adjusting the reference voltage based on the comparison signal such that the voltage level of the reference voltage increases or decreases; and
   calibrating an output impedance of the memory device based on a first digital code corresponding to an average reference voltage level, the average reference voltage level being obtained by averaging a prescribed number of stored voltage levels of the reference voltage stored as a result of repeatedly outputting the comparison signal, storing the voltage level of the reference voltage, and adjusting the reference voltage.

2. The method of claim 1,
   wherein, when the data transmitter is not driven, the power supply voltage is at an initial voltage level,
   wherein, when the data transmitter is driven, the power supply voltage is at a voltage level lower than the initial voltage level, and
   wherein, when the data transmitter is driven, the output impedance of the memory device is adjusted by controlling the voltage level of the reference voltage such that the voltage level of the reference voltage is equal to a voltage level of the power supply voltage.

3. The method of claim 1, wherein outputting the comparison signal comprises:
   when a voltage level of the power supply voltage is less than or equal to the voltage level of the reference voltage, generating the comparison signal having a first logic level; and
   when the voltage level of the power supply voltage is greater than the voltage level of the reference voltage, generating the comparison signal having a second logic level different from the first logic level.

4. The method of claim 3, wherein storing the voltage level of the reference voltage includes:
   detecting whether the comparison signal has changed from one of the first and second logic levels to another one of the first and second logic levels;
   outputting an enable signal that is activated when the comparison signal has changed logic levels; and
   storing the voltage level of the reference voltage based on activation of the enable signal.

5. The method of claim 4, wherein storing the voltage level of the reference voltage when the comparison signal has changed logic levels further includes:
   increasing a count value by one when the comparison signal has changed logic levels.

6. The method of claim 5, wherein calibrating the output impedance of the memory device based on the first digital code corresponding to the average reference voltage level includes:
   determining whether the count value has reached the prescribed number of stored voltage levels of the reference voltage;
   when the count value is less than the prescribed number of stored voltage levels of the reference voltage, repeatedly performing operations of outputting the comparison signal, storing the voltage level of the reference voltage, and adjusting the reference voltage, until the count value is equal to the prescribed number of stored voltage levels of the reference voltage;
   when the count value is equal to the prescribed number of stored voltage levels of the reference voltage, obtaining the first digital code corresponding to the average reference voltage level; and
   determining the output impedance of the memory device to correspond to the first digital code.

7. The method of claim 3, wherein adjusting the reference voltage based on the comparison signal includes:
   when the voltage level of the power supply voltage is less than or equal to the voltage level of the reference voltage, reducing the voltage level of the reference voltage by a first voltage level; and
   when the voltage level of the power supply voltage is greater than the voltage level of the reference voltage, increasing voltage level of the reference voltage by the first voltage level.

8. The method of claim 1, further comprising,
   storing a plurality of preset digital codes corresponding to changes in voltage level of the power supply voltage, wherein, the first digital code is included in the plurality of preset digital codes.

9. The method of claim 8, wherein the power supply voltage has M (Mis a positive integer) voltage levels different from each other, and
wherein the plurality of preset digital codes includes M different digital codes corresponding to the M voltage levels of the power supply voltage.

10. The method of claim 8, wherein the plurality of preset digital codes are stored as a look-up table.

11. The method of claim 1, wherein outputting the comparison signal, storing the voltage level of the reference voltage when the comparison signal changes from the first logic level to the second logic level, adjusting the reference voltage based on the comparison signal, and calibrating the output impedance of the memory device based on the first digital code corresponding to the average reference voltage level are executed while the memory device performs a read operation.

12. The method of claim 1, wherein outputting the comparison signal, storing the voltage level of the reference voltage when the comparison signal changes from the first logic level to the second logic level, adjusting the reference voltage based on the comparison signal, and calibrating the output impedance of the memory device based on the first digital code corresponding to the average reference voltage level are executed while the memory device performs a training operation.

13. An impedance calibration circuit included in a memory device including a data transmitter, the impedance calibration circuit comprising:
   a voltage drop sensing module including:
      a comparator configured to output a comparison signal by comparing a power supply voltage and a reference voltage, the power supply voltage being supplied to the data transmitter when the data transmitter is driven;
      a reference voltage generator configured to generate the reference voltage, and configured to adjust the reference voltage based on the comparison signal such that a voltage level of the reference voltage increases or decreases; and
      a first module configured to store a prescribed number of voltage levels of the reference voltage when the comparison signal changes from a first logic value to a second logic value, configured to obtain an average reference voltage level by averaging the prescribed number of voltage levels of the reference voltage, and configured to calculate a digital code corresponding to the average reference voltage level; and
   a calibration module configured to calibrate an output impedance of the memory device based at least in part on the digital code.

14. The impedance calibration circuit of claim 13, wherein the reference voltage generator comprises:
   an adder/subtractor configured to generate a control voltage based on the comparison signal such that the voltage level of the reference voltage increases or decreases by a first voltage level; and
   a replica circuit having a same configuration as a power supply module that generates the power supply voltage, and configured to generate the reference voltage based on the control voltage.

15. The impedance calibration circuit of claim 14, wherein the replica circuit comprises:
   an operational amplifier including a first input terminal, a second input terminal, and an output terminal, the first input terminal receiving the control voltage, the second input terminal connected to a first node that outputs the reference voltage;
   a transistor including a gate, a drain, and a source, the gate connected to the output terminal of the operational amplifier, the drain connected to the first node, and the source receiving a reference power supply voltage for generating the reference voltage;
   a resistor connected between the first node and a ground terminal; and
   a capacitor connected between the first node and the ground terminal.

16. The impedance calibration circuit of claim 13,
wherein the voltage drop sensing module further includes a second module configured to output an enable signal that is activated when the comparison signal changes from the first logic value to the second logic value,
wherein, based on activation of the enable signal, the first module is configured to store the voltage level of the reference voltage, to obtain the average reference voltage level, and to calculate the digital code.

17. The impedance calibration circuit of claim 16,
wherein the voltage drop sensing module further includes a counter circuit configured to increase a count by a prescribed value when the comparison signal changes from the first logic value to the second logic value,
wherein, when the count reaches the prescribed number of voltage levels of the reference voltage, the first module is configured to obtain the average reference voltage level by averaging the prescribed number of voltage levels of the reference voltage, and is configured to obtain the digital code corresponding to the average reference voltage level.

18. The impedance calibration circuit of claim 13,
wherein the data transmitter operates based on a first clock signal, and
wherein the comparator and the first module operate based on second and third clock signals, respectively, each of second and third clock signals having a lower frequency than the first clock signal.

19. The impedance calibration circuit of claim 18,
wherein the voltage drop sensing module further includes a second module configured to output an enable signal that is activated when the comparison signal changes from the first logic value to the second logic value, and
wherein the second module operates based on the second clock signal.

20. A method of calibrating impedance of a memory device including a data transmitter, the method comprising the following operations:
   operation S1: when a voltage level of a power supply voltage is less than or equal to a voltage level of a reference voltage, generating a comparison signal having a first logic level;
   operation S2: when the voltage level of the power supply voltage is greater than the voltage level of the reference voltage, generating the comparison signal having a second logic level different from the first logic level;
   operation S3: detecting whether the comparison signal has changed from one of the first and second logic levels to another of the first and second logic levels;
   operation S4: outputting an enable signal that is activated when the comparison signal has changed from one of the first and second logic levels to another of the first and second logic levels;
   operation S5: storing the voltage level of the reference voltage based on activation of the enable signal;

operation S6: when the voltage level of the power supply voltage is less than or equal to the voltage level of the reference voltage, reducing the voltage level of the reference voltage by a first voltage value;

operation S7: when the voltage level of the power supply voltage is greater than the voltage level of the reference voltage, increasing the voltage level of the reference voltage by the first voltage value; and operation S8: calibrating an output impedance of the memory device based on a digital code corresponding to an average reference voltage level, the average reference voltage level being obtained by averaging a prescribed number of voltage levels of the reference voltage stored as a result of repeatedly performing the operation S1 to S7.

\* \* \* \* \*